US011852940B2

(12) United States Patent
Yonemoto et al.

(10) Patent No.: US 11,852,940 B2
(45) Date of Patent: Dec. 26, 2023

(54) OPTICALLY ANISOTROPIC FILM, OPTICAL ELEMENT, AND OPTICAL SYSTEM

(71) Applicant: FUJIFILM Corporation, Tokyo (JP)

(72) Inventors: Takashi Yonemoto, Minamiashigara (JP); Yukito Saitoh, Minamiashigara (JP); Hiroshi Sato, Minamiashigara (JP); Yuki Fukushima, Minamiashigara (JP); Mitsuyoshi Ichihashi, Minamiashigara (JP); Keisuke Kodama, Minamiashigara (JP); Shunya Katoh, Minamiashigara (JP); Naoto Yanase, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/067,250

(22) Filed: Dec. 16, 2022

(65) Prior Publication Data

US 2023/0125215 A1 Apr. 27, 2023

Related U.S. Application Data

(63) Continuation of application No. PCT/JP2021/022444, filed on Jun. 14, 2021.

(30) Foreign Application Priority Data

Jun. 19, 2020 (JP) ................................ 2020-106364

(51) Int. Cl.
*G02F 1/137* (2006.01)
*G02B 5/30* (2006.01)

(52) U.S. Cl.
CPC ....... *G02F 1/13706* (2021.01); *G02B 5/3016* (2013.01)

(58) Field of Classification Search
CPC .......................... G02F 1/13706; G02B 5/3016
See application file for complete search history.

(56) References Cited

U.S. PATENT DOCUMENTS

2015/0205182 A1 7/2015 Leister
2016/0011353 A1 1/2016 Escuti et al.
(Continued)

FOREIGN PATENT DOCUMENTS

JP 2016-519327 A 6/2016
JP 2017-522601 A 8/2017
(Continued)

OTHER PUBLICATIONS

International Preliminary Report on Patentability, dated Dec. 29, 2022, and Written Opinion of the International Searching Authority, dated Jul. 13, 2021, for International Application No. PCT/JP2021/022444, with an English translation.
(Continued)

*Primary Examiner* — Anne M Hines
(74) *Attorney, Agent, or Firm* — Birch, Stewart, Kolasch & Birch, LLP

(57) ABSTRACT

An optically anisotropic film is formed of a liquid crystal composition including a liquid crystal compound and has a liquid crystal alignment pattern in which a direction of an optical axis derived from the liquid crystal compound changes while continuously rotating in at least one in-plane direction of the optically anisotropic film, and the optically anisotropic film satisfies predetermined requirements.

11 Claims, 9 Drawing Sheets

L4 16 30 30 Q2 E2 L5 X

(56) References Cited

U.S. PATENT DOCUMENTS

| | | | |
|---|---|---|---|
| 2016/0033698 | A1 | 2/2016 | Escuti et al. |
| 2018/0164480 | A1 | 6/2018 | Yoshida |
| 2019/0112529 | A1* | 4/2019 | Kim ........................ C09K 19/54 |
| 2019/0114457 | A1* | 4/2019 | Li ........................ G02F 1/13338 |
| 2020/0142200 | A1 | 5/2020 | Sato et al. |
| 2021/0173263 | A1* | 6/2021 | You ................... G02F 1/133635 |
| 2021/0208316 | A1 | 7/2021 | Sato et al. |
| 2022/0099872 | A1 | 3/2022 | Sasata et al. |

FOREIGN PATENT DOCUMENTS

| | | | |
|---|---|---|---|
| WO | WO 2016/194961 | A1 | 12/2016 |
| WO | WO 2019/004336 | A1 | 1/2019 |
| WO | WO 2020/066429 | A1 | 4/2020 |
| WO | WO 2020/122127 | A1 | 6/2020 |

OTHER PUBLICATIONS

International Search Report for International Application No. PCT/JP2021/022444, dated Jul. 13, 2021, with an English translation.

* cited by examiner

FIG. 20
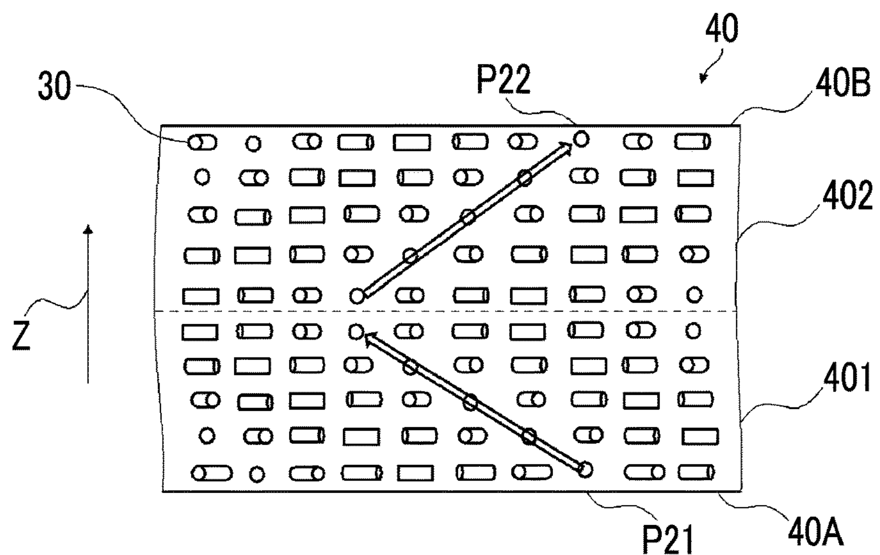
FIG. 21
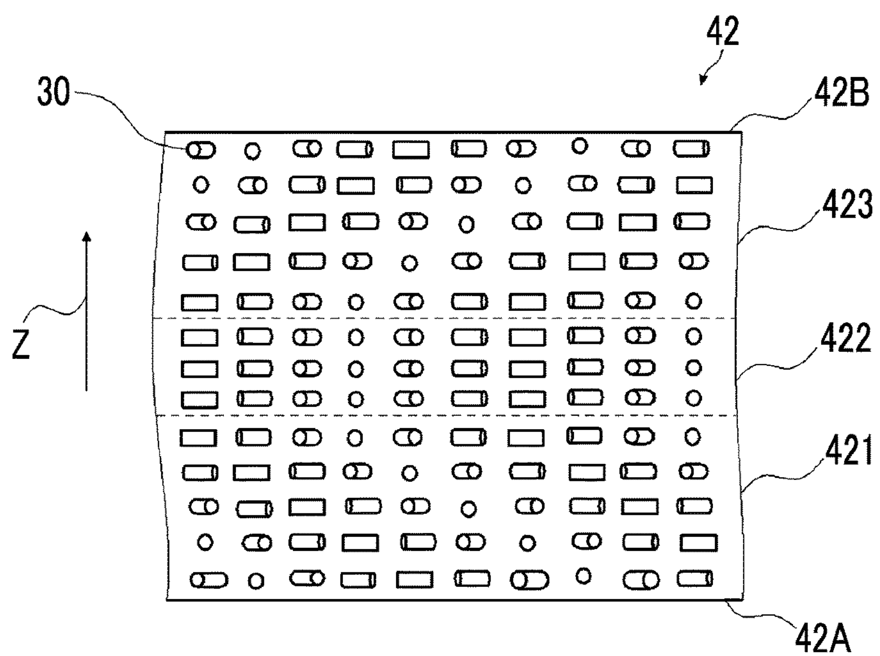
FIG. 22
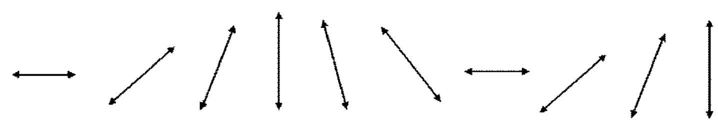
FIG. 23

OPTICALLY ANISOTROPIC FILM, OPTICAL ELEMENT, AND OPTICAL SYSTEM

CROSS-REFERENCE TO RELATED APPLICATIONS

This application is a Continuation of PCT International Application No. PCT/JP2021/022444 filed on Jun. 14, 2021, which claims priority under 35 U.S.C § 119(a) to Japanese Patent Application No. 2020-106364 filed on Jun. 19, 2020. Each of the above application(s) is hereby expressly incorporated by reference, in its entirety, into the present application.

BACKGROUND OF THE INVENTION

1. Field of the Invention

The present invention relates to an optically anisotropic film, an optical element, and an optical system.

2. Description of the Related Art

In many optical devices, optical systems, and the like, polarized light is used. Accordingly, the development of an optical element that controls reflection, focusing, scattering, or the like of polarized light has progressed.

For example, JP2017-522601A describes an optical element comprising a plurality of stacked birefringent sublayers configured to alter a direction of propagation of light passing therethrough according to a Bragg condition, in which the stacked birefringent sublayers respectively comprise local optical axes that vary along respective interfaces between adjacent ones of the stacked birefringent sublayers to define respective grating periods.

The optical element described in JP2017-522601A includes an optically anisotropic thin film (corresponding to an optically anisotropic film) including a liquid crystal compound. Specifically, the optical element described in JP2017-522601A is a diffraction element including an optically anisotropic film that diffracts light by changing a direction of an optical axis derived from a liquid crystal compound in one in-plane direction.

The diffraction element formed of the liquid crystal compound is expected to be used as an optical member, for example, an image projection device such as augmented reality (AR) glasses.

SUMMARY OF THE INVENTION

As performance required for the diffraction element, an excellent diffraction efficiency is required to be exhibited even in a case where an angle of incident light deviates from a predetermined angle.

The present inventors found that, in the diffraction element described in JP2017-522601A, the above-described properties are not sufficient and further improvement is necessary.

The present invention has been made in consideration of the above-described circumstances, and an object thereof is to provide an optically anisotropic film that exhibits an excellent diffraction efficiency even in a case where an incidence angle of incidence light changes.

In addition, another object of the present invention is to provide an optical element and an optical system.

The present inventors found that the object can be achieved by the following configurations.

(1) An optically anisotropic film that is formed of a liquid crystal composition including a liquid crystal compound, the optically anisotropic film comprising:

a liquid crystal alignment pattern where a direction of an optical axis derived from the liquid crystal compound changes while continuously rotating in at least one in-plane direction of the optically anisotropic film, in which a requirement X described below and a requirement Y1 or a requirement Y2 described below are satisfied.

(2) The optically anisotropic film according to (1), in which in a case where a length over which the optical axis derived from the liquid crystal composition rotates by 180° in a plane in the direction in which the liquid crystal alignment pattern extends is set as a single period, the length of the single period in the liquid crystal alignment pattern gradually decreases in the one in-plane direction in which the direction of the optical axis changes while continuously rotating in the liquid crystal alignment pattern, and the requirement Y2 is satisfied.

(3) The optically anisotropic film according to (1) or (2), in which the first region and the second region are alternately provided in the direction in which the liquid crystal alignment pattern extends.

(4) The optically anisotropic film according to any one of (1) to (3), in which in a case where a length over which the optical axis derived from the liquid crystal composition rotates by 180° in a plane in the direction in which the liquid crystal alignment pattern extends is set as a single period, the first region and the second region are alternately provided in the direction in which the liquid crystal alignment pattern extends and the single period includes at least two first regions and at least two second regions.

(5) The optically anisotropic film according to any one of (1) to (4), in which in a case where a length over which the optical axis derived from the liquid crystal composition rotates by 180° in a plane in the direction in which the liquid crystal alignment pattern extends is set as a single period, a minimum value of the length of the single period is 20 μm or less.

(6) The optically anisotropic film according to any one of (1) to (5), in which in a case where a length over which the optical axis derived from the liquid crystal composition rotates by 180° in a plane in the direction in which the liquid crystal alignment pattern extends is set as a single period, a thickness of the optically anisotropic film is more than ¼ times a minimum value of the length of the single period.

(7) The optically anisotropic film according to any one of (1) to (6), in which the liquid crystal alignment pattern is a concentric circular pattern having a concentric circular shape where the one in-plane direction in which the direction of the optical axis derived from the liquid crystal compound changes while continuously rotating moves from an inner side toward an outer side.

(8) The optically anisotropic film according to any one of (1) to (7), in which the optically anisotropic film includes regions where twisted directions of the optical axes derived from the liquid crystal compounds in the thickness direction are different, the regions include a region A where the direction of the optical axis derived from the liquid crystal compound is twisted in a thickness direction and rotates and a region B where the direction of the optical axis derived from the liquid crystal compound is twisted in the thickness direction and rotates, and a twisted direction of the optical axis derived from the liquid crystal compound in the region A and a twisted direction of the optical axis derived from the liquid crystal compound in the region B are opposite to each other. (9) An optical element comprising:

the optically anisotropic film according to any one of (1) to (8).

(10) An optical system comprising:

the optically anisotropic film according to any one of (1) to (8) or the optical element according to (9); and a light source or a detector.

According to the present invention, it is possible to provide an optically anisotropic film that exhibits an excellent diffraction efficiency even in a case where an incidence angle of incidence light changes.

In addition, according to the present invention, it is possible to provide an optical element and an optical system.

BRIEF DESCRIPTION OF THE DRAWINGS

FIG. 20 is a cross-sectional view conceptually showing another example of the optically anisotropic film.

FIG. 21 is a cross-sectional view conceptually showing another example of the optically anisotropic film.

FIG. 22 is a diagram showing an alignment pattern in a photo-alignment film according to Comparative Example 1.

FIG. 23 is a diagram showing an alignment pattern in a photo-alignment film according to Example 1.

DESCRIPTION OF THE PREFERRED EMBODIMENTS

Hereinafter, the details of the present invention will be described.

The following description regarding components has been made based on a representative embodiment of the present invention. However, the present invention is not limited to the embodiment.

In the present specification, numerical ranges represented by "to" include numerical values before and after "to" as lower limit values and upper limit values.

In the present specification, materials that correspond to each of components may be used alone or in combination of two or more kinds. Here, in a case where two or more kinds of materials are used in combination for each of components, the content of the component refers to the total content of the materials to be combined unless specified otherwise.

In the present specification, "(meth)acrylate" represents "either or both of acrylate and methacrylate".

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

A feature point of an optically anisotropic film according to an embodiment of the present invention is that it satisfies a requirement X and a requirement Y1 or a requirement Y2 described below. Although described below in detail, the requirement X represents that both of a region where an angle between optical axes derived from liquid crystal compounds in one surface and another surface of the optically anisotropic film is less than 3° and a region where the angle is 3° or more are provided. In addition, although described below in detail, the requirement Y1 and the requirement Y2 represent that a variation in rotation angle with respect to a reference of a direction of a dark line corresponding to the average of directions of optical axes derived from the liquid crystal compounds in a thickness direction of the optically anisotropic film is in a predetermined range. The optically anisotropic film satisfies the requirement X and the requirement Y1 or Y2 such that a high diffraction efficiency is exhibited even in a case where an incidence angle of incidence light changes. In the present specification, "°" represents "degree".

Figure 1:
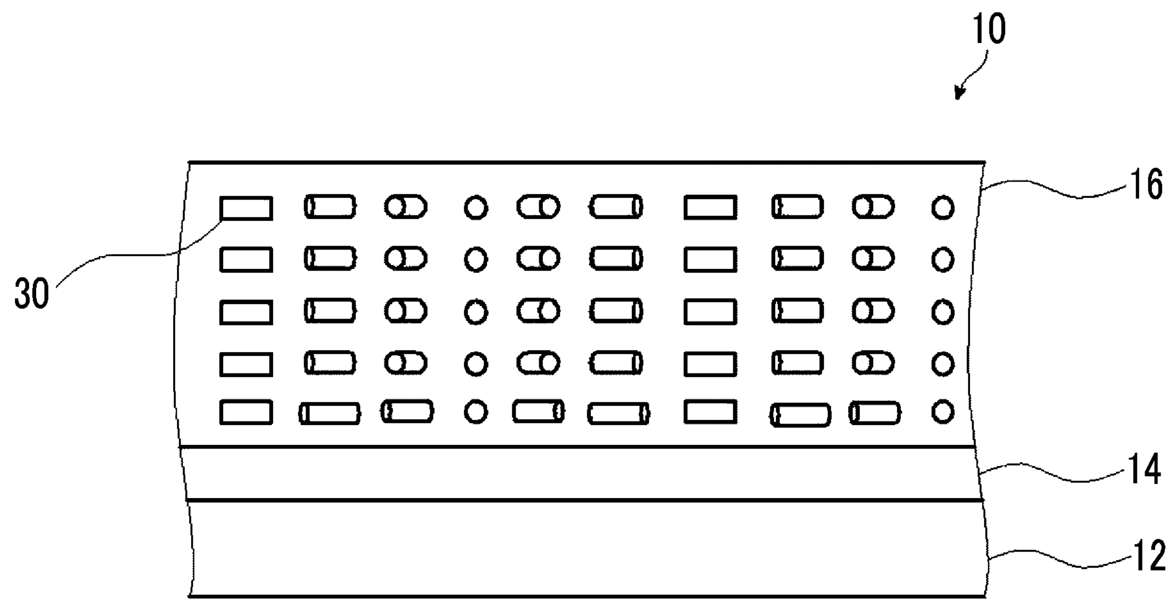
FIG. 1 is a diagram conceptually showing an example of an optical element according to the present invention.
Figure 2:
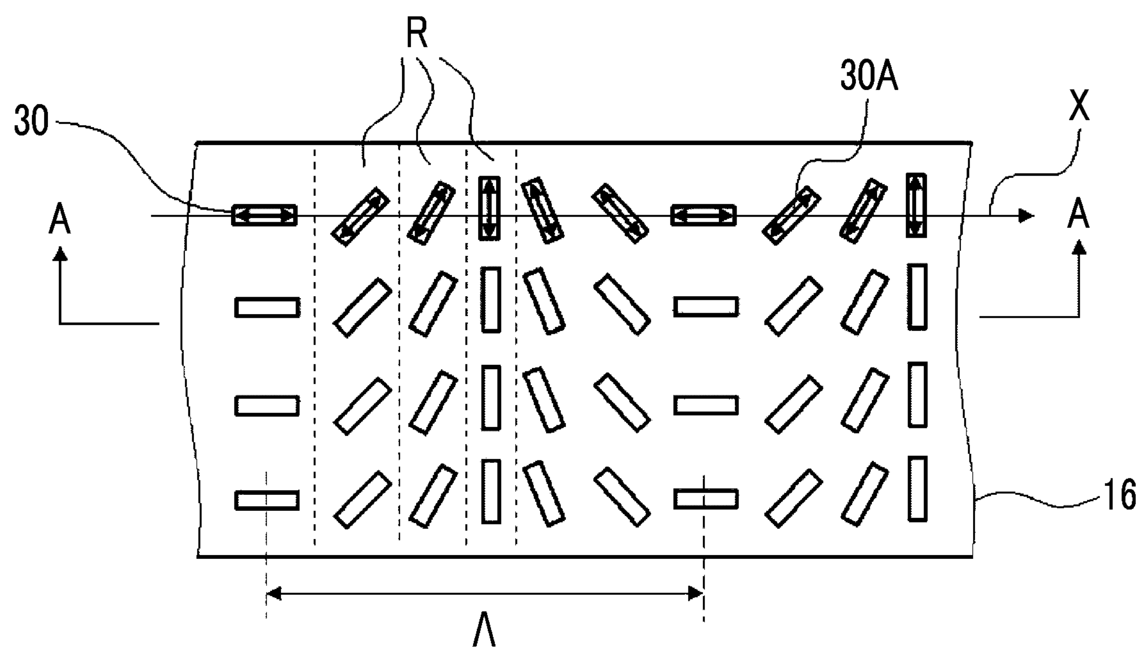
FIG. 2 is a plan view showing an optically anisotropic film of the optical element shown in FIG. 1.

FIG. 1 is a side view conceptually showing an example of the optical element according to the embodiment of the present invention. FIG. 2 is a plan view showing the optical element shown in FIG. 1. The plan view is a view in a case where an optical element 10 is seen from the top in FIG. 1, that is, FIG. 1 is a view in a case where the optical element 10 is seen from a thickness direction (laminating direction of the respective layers (films)). In other words, FIG. 1 is a view in a case where the optically anisotropic film 16 is seen from a direction perpendicular to a main surface.

In order to clearly show a configuration of the optical element 10 according to the embodiment of the present invention, FIG. 2 shows only a liquid crystal compound 30 on a side of an optically anisotropic film 16 opposite to a photo-alignment film 14 side. However, as shown in FIG. 1, the optically anisotropic film 16 has a structure in which the liquid crystal compound 30 is laminated in the thickness direction.

The optical element 10 shown in FIG. 1 includes a support 12, the photo-alignment film 14, and the optically anisotropic film 16. The optically anisotropic film 16 is formed of a composition including a liquid crystal compound and has a predetermined liquid crystal alignment pattern in which a direction of an optical axis derived from the liquid crystal compound continuously rotates in one in-plane direction.

The optical element 10 shown in FIG. 1 includes the support 12, the photo-alignment film 14, and the optically anisotropic film 16. However, the optical element according to the embodiment of the present invention is no limited to this configuration.

Hereinafter, each of the members forming the optical element 10 will be described in detail.

<Support>

The support 12 supports the photo-alignment film 14 and the optically anisotropic film 16.

As the support 12, various sheet-shaped materials (films or plate-shaped materials) can be used as long as they can support the photo-alignment film 14 and the optically anisotropic film 16.

A transmittance of the support 12 with respect to corresponding light is preferably 50% or more, more preferably 70% or more, and still more preferably 85% or more.

The thickness of the support 12 is not particularly limited and may be appropriately set depending on the use of the optical element 10, a material for forming the support 12, and the like in a range where the photo-alignment film 14 and the optically anisotropic film 16 can be supported.

The thickness of the support 12 is preferably 1 to 1000 μm, more preferably 3 to 250 μm, and still more preferably 5 to 150 μm.

The support 12 may have a monolayer structure or a multi-layer structure.

In a case where the support 12 has a monolayer structure, examples thereof include supports formed of glass, triacetyl cellulose, polyethylene terephthalate, polycarbonates, polyvinyl chloride, poly (meth)acrylate, polyolefin, and the like. In a case where the support 12 has a multi-layer structure, examples thereof include a support including: one of the above-described supports having a monolayer structure that is provided as a substrate; and another layer that is provided on a surface of the substrate.

<Photo-Alignment Film>

The photo-alignment film 14 is an alignment film for aligning the liquid crystal compound 30 to the predetermined liquid crystal alignment pattern during the formation of the optically anisotropic film 16 of the optical element 10.

Although described below, the optically anisotropic film 16 has a liquid crystal alignment pattern in which a direction of an optical axis 30A derived from the liquid crystal compound 30 changes while continuously rotating in one in-plane direction. Accordingly, the photo-alignment film 14 is formed such that the optically anisotropic film 16 can form the liquid crystal alignment pattern.

In the following description, “the direction of the optical axis 30A rotates” will also be simply referred to as “the optical axis 30A rotates”.

Preferable examples of the photo-alignment material used in the photo-alignment film 14 include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate (cinnamic acid) compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking polyester, a cinnamate compound, or a chalcone compound is suitably used.

A method of forming the photo-alignment film 14 is not particularly limited, and examples thereof include a method including: applying a composition for forming a photo-alignment film including a predetermined photo-alignment material to a surface of the support 12; drying the applied composition to obtain the coating film (photo-alignment film precursor); and exposing the coating film to laser light to form an alignment pattern.

Figure 3:
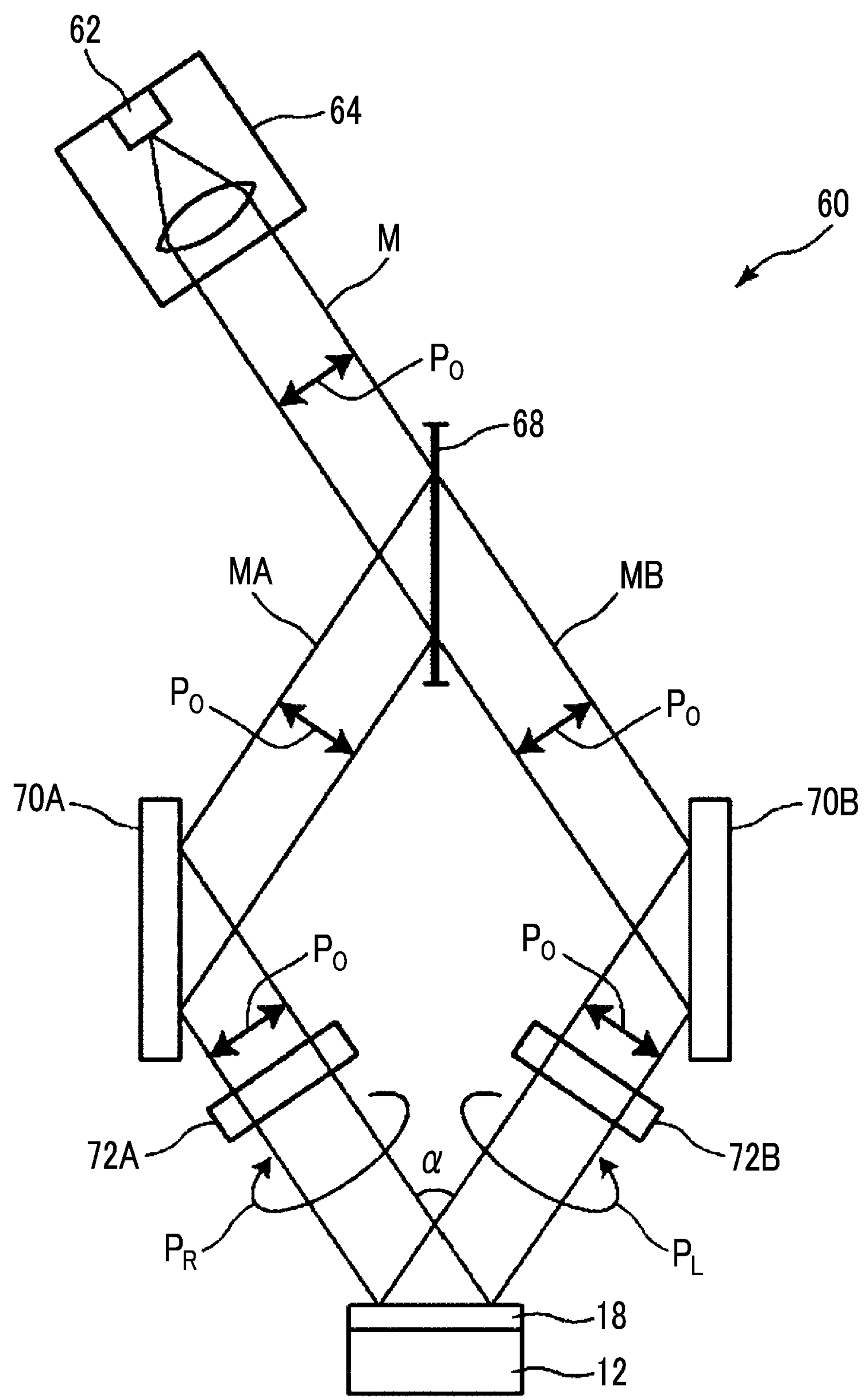
FIG. 3 is a diagram conceptually showing an example of an exposure device for preparing a photo-alignment film.

FIG. 3 conceptually shows an example of an exposure device that forms the alignment pattern.

An exposure device 60 shown in FIG. 3 includes: a light source 64 that includes a laser 62; a beam splitter 68 that splits laser light M emitted from the laser 62 into two beams MA and MB; mirrors 70A and 70B that are disposed on optical paths of the split two beams MA and MB; and λ/4 plates 72A and 72B.

Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The support 12 including a coating film 18 on which the alignment pattern is not yet formed is disposed at an exposed portion, the two beams MA and MB intersect and interfere with each other on the coating film 18, and the coating film 18 is irradiated with and exposed to the interference light.

Due to the interference in this case, the polarization state of light with which the coating film 18 is irradiated periodically changes according to interference fringes. As a result, the photo-alignment film 14 having the alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the crystal alignment pattern in which the direction of the optical axis 30A derived from the liquid crystal compound 30 continuously rotates in the one in-plane direction, the length (single period Λ) of the single period over which the direction of the optical axis 30A rotates by 180° in the one in-plane direction in which the direction of the optical axis 30A rotates can be adjusted.

By forming the optically anisotropic film on the photo-alignment film having the alignment pattern in which the alignment state periodically changes, as described below, the optically anisotropic film 16 having the liquid crystal alignment pattern in which the direction of the optical axis 30A derived from the liquid crystal compound 30 continuously rotates in the one in-plane direction can be formed.

In addition, by rotating the optical axes of the λ/4 plates 72A and 72B by 90°, respectively, the rotation direction of the optical axis 30A can be reversed.

The photo-alignment film will be described above as an example of the photo-alignment film. In the optical element according to the embodiment of the present invention, another alignment film (for example, a rubbed alignment film) may be used instead of the photo-alignment film.

In addition, the alignment pattern may be provided on the support without providing the alignment film. Specifically, the optically anisotropic film 16 may be formed directly on the support 12 by forming the alignment pattern on the support 12 using a method of rubbing the support 12, a method of processing the support 12 with laser light or the like, or the like.

<Optically Anisotropic Film>

The optically anisotropic film 16 is formed of a liquid crystal composition including a liquid crystal compound.

As shown in FIG. 2, the optically anisotropic film 16 has the liquid crystal alignment pattern in which the direction of the optical axis 30A derived from the liquid crystal compound 30 changes while continuously rotating counterclockwise in the one in-plane direction indicated by arrow X in a plane of the optically anisotropic film 16. In FIG. 2, the direction of the optical axis 30A derived from the liquid crystal compound 30 rotates counterclockwise. However, the present invention is not limited to this aspect, and the direction of the optical axis 30A may rotate clockwise.

The optical axis 30A derived from the liquid crystal compound 30 is an axis having the highest refractive index in the liquid crystal compound 30. For example, in a case where the liquid crystal compound 30 is a rod-like liquid crystal compound, the optical axis 30A is along a rod-like major axis direction.

In the following description, "one in-plane direction indicated by arrow X" will also be simply referred to as "arrow X direction". In addition, in the following description, the optical axis 30A derived from the liquid crystal compound 30 will also be referred to as "the optical axis 30A of the liquid crystal compound 30" or "the optical axis 30A".

In the optically anisotropic film 16, the liquid crystal compound 30 is two-dimensionally aligned in a plane parallel to the arrow X direction and a Y direction perpendicular to the arrow X direction. In FIG. 1 and FIGS. 4, 5, 6, 14, 18, 20, and 21 described below, the Y direction is a direction perpendicular to the paper plane.

FIG. 2 conceptually shows a plan view of the optically anisotropic film 16.

The optically anisotropic film 16 has the liquid crystal alignment pattern in which the direction of the optical axis 30A derived from the liquid crystal compound 30 changes while continuously rotating in the arrow X direction in a plane of the optically anisotropic film 16.

Specifically, "the direction of the optical axis 30A of the liquid crystal compound 30 changes while continuously rotating in the arrow X direction (the predetermined one in-plane direction)" represents that an angle between the optical axis 30A of the liquid crystal compound 30, which is arranged in the arrow X direction, and the arrow X direction varies depending on positions in the arrow X direction, and the angle between the optical axis 30A and the arrow X direction sequentially changes from θ to θ+180° or θ−180° in the arrow X direction.

A difference between the angles of the optical axes 30A of the liquid crystal compound 30 adjacent to each other in the arrow X direction is preferably 45° or less, more preferably 15° or less, and smaller angles are still more preferable.

On the other hand, regarding the liquid crystal compound 30 forming the optically anisotropic film 16, the liquid crystal compounds 30 having the same direction of the optical axes 30A are arranged at regular intervals in the Y direction perpendicular to the arrow X direction, that is, the Y direction perpendicular to the one in-plane direction in which the optical axis 30A continuously rotates.

In other words, regarding the liquid crystal compound 30 forming the optically anisotropic film 16, in the liquid crystal compounds 30 arranged in the Y direction, angles between the directions of the optical axes 30A and the arrow X direction are the same.

In the optical element 10, in the liquid crystal alignment pattern of the liquid crystal compound 30, the length (distance) over which the optical axis 30A of the liquid crystal compound 30 rotates by 180° in the arrow X direction in which the direction of the optical axis 30A changes while continuously rotating in a plane is the length Λ of the single period in the liquid crystal alignment pattern. In other words, the length of the single period in the liquid crystal alignment pattern is defined as the distance between θ and θ+180° that is a range of the angle between the optical axis 30A of the liquid crystal compound 30 and the arrow X direction.

That is, a distance between centers of two liquid crystal compounds 30 in the arrow X direction is the length Λ of the single period, the two liquid crystal compounds having the same angle in the arrow X direction. Specifically, as shown in FIG. 2, a distance of centers in the arrow X direction of two liquid crystal compounds 30 in which the arrow X direction and the direction of the optical axis 30A match each other is the length Λ of the single period. In the following description, the length Λ of the single period will also be referred to as "single period Λ".

In the optical element 10 according to the embodiment of the present invention, in the liquid crystal alignment pattern of the optically anisotropic film 16, the single period Λ is repeated in the arrow X direction, that is, in the one in-plane direction in which the direction of the optical axis 30A changes while continuously rotating.

As described above, in the liquid crystal compounds 30 arranged in the Y direction in the optically anisotropic film 16, the angles between the optical axes 30A and the arrow X direction (the one in-plane direction in which the direction of the optical axis of the liquid crystal compound 30 rotates) are the same. Regions where the liquid crystal compounds 30 in which the angles between the optical axes 30A and the arrow X direction are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically anisotropic film. Here, the difference in refractive index generated by refractive index anisotropy of the region R in the optically anisotropic film is defined by a difference between a refractive index of a direction of an in-plane slow axis of the region R and a refractive index of a direction perpendicular to the direction of the slow axis.

That is, the difference Δn in refractive index generated by refractive index anisotropy of the region R is the same as a difference between a refractive index of the liquid crystal compound 30 in the direction of the optical axis 30A and a refractive index of the liquid crystal compound 30 in a direction perpendicular to the optical axis 30A in a plane of the region R. That is, the difference Δn in refractive index is the same as the difference in refractive index of the liquid crystal compound.

In a case where circularly polarized light is incident into the above-described optically anisotropic film 16, the light is refracted such that the direction of the circularly polarized light is converted.

Figure 4:
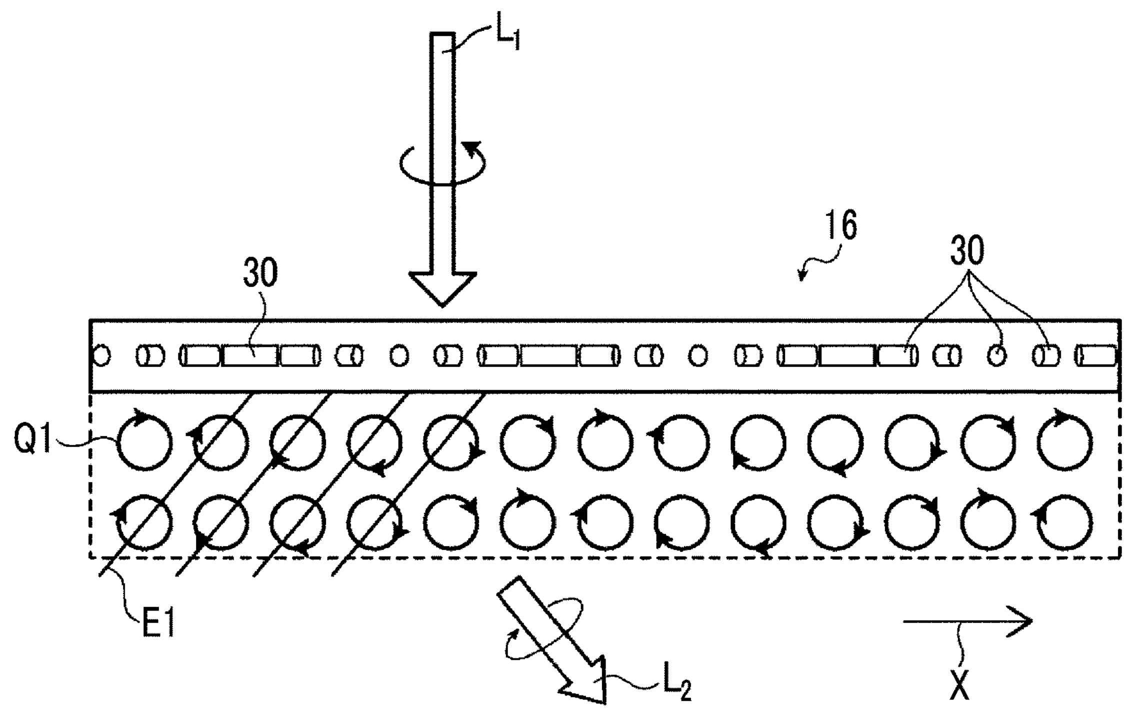
FIG. 4 is a conceptual diagram showing an action of the optically anisotropic film of the optical element shown in FIG. 1.

This action is conceptually shown in FIG. 4 using the optically anisotropic film 16 as an example. In the optically anisotropic film 16, the value of the product of the difference in refractive index of the liquid crystal compound and the thickness of the optically anisotropic film is λ/2. In FIG. 4, in order to simplify the drawings, the number of the liquid crystal compounds 30 in the optically anisotropic film 16 is reduced and shown.

As shown in FIG. 4, in a case where the value of the product of the difference in refractive index of the liquid crystal compound in the optically anisotropic film 16 and the thickness of the optically anisotropic film is λ/2 and incidence light $L_1$ as left circularly polarized light is incident into the optically anisotropic film 16, the incidence light $L_1$ transmits through the optically anisotropic film 16 to be imparted with a retardation of 180°, and the transmitted light $L_2$ is converted into right circularly polarized light.

In addition, in a case where the incidence light $L_1$ transmits through the optically anisotropic film 16, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_1$ varies depending on the direction of the optical axis 30A. Further, the liquid crystal alignment pattern that is formed in the optically anisotropic film 16 is a pattern that is periodic in the arrow X direction. Therefore, as shown in FIG. 4, the incidence light $L_1$ transmitted through the optically anisotropic film 16 is imparted with an absolute phase Q1 that is periodic in the arrow X direction corresponding to the direction of each of the optical axes 30A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

Figure 5:
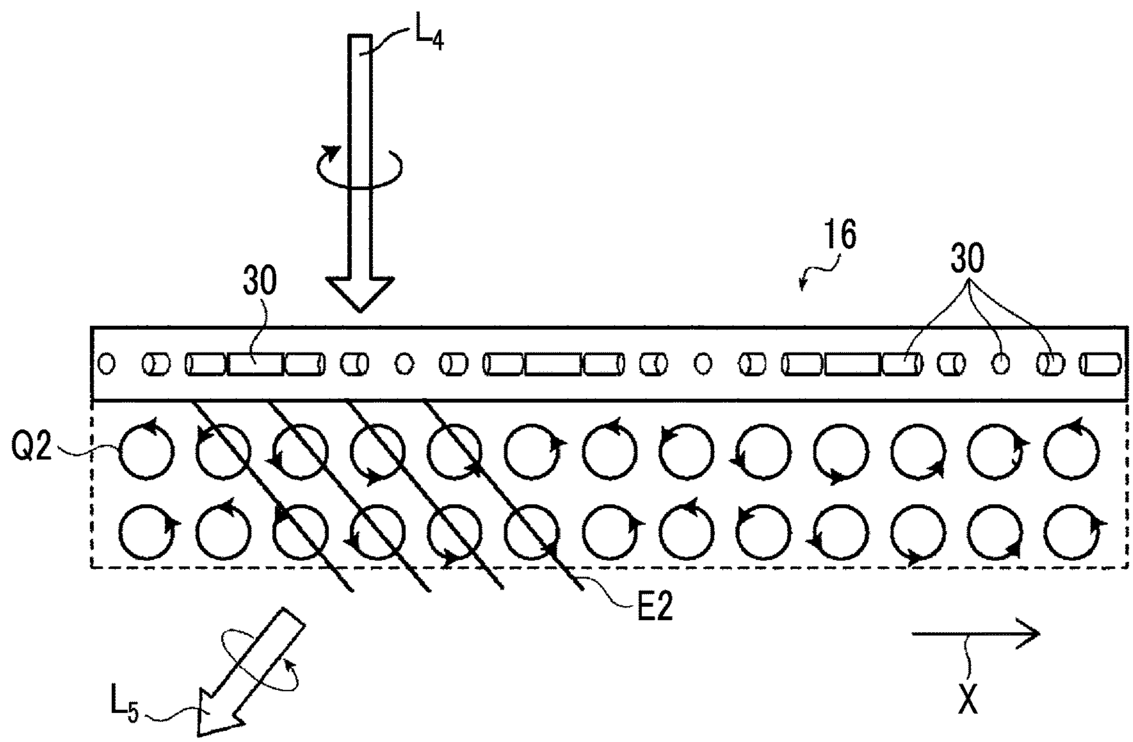
FIG. 5 is a conceptual diagram showing the action of the optically anisotropic film of the optical element shown in FIG. 1.

On the other hand, as conceptually shown in FIG. 5, in a case where the value of the product of the difference in refractive index of the liquid crystal compound in the optically anisotropic film 16 and the thickness of the optically anisotropic film 16 is λ/2 and incidence light $L_4$ as right circularly polarized light is incident into the optically anisotropic film 16, the incidence light $L_4$ transmits through the optically anisotropic film 16 to be imparted with a retardation of 180° and is converted into transmitted light $L_5$ of left circularly polarized light.

In addition, in a case where the incidence light $L_4$ transmits through the optically anisotropic film 16, an absolute phase thereof changes depending on the direction of the optical axis 30A of each of the liquid crystal compounds 30. In this case, the direction of the optical axis 30A changes while rotating in the arrow X direction. Therefore, the amount of change in the absolute phase of the incidence light $L_4$ varies depending on the direction of the optical axis 30A. Further, the liquid crystal alignment pattern that is formed in the optically anisotropic film 16 is a pattern that is periodic in the arrow X direction. Therefore, as shown in FIG. 5, the incidence light $L_4$ transmitted through the optically anisotropic film 16 is imparted with an absolute phase Q2 that is periodic in the arrow X direction corresponding to the direction of each of the optical axes 30A.

Here, the incidence light $L_4$ is right circularly polarized light. Therefore, the absolute phase Q2 that is periodic in the arrow X direction corresponding to the direction of the optical axis 30A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

In the optically anisotropic film 16, it is preferable that the in-plane retardation value of the plurality of regions R is a half wavelength. It is preferable that an in-plane retardation $Re(550)=\Delta n_{550}\times d$ of the plurality of regions R of the optically anisotropic film 16 with respect to the incidence light having a wavelength of 550 nm is in a range defined by the following Expression (1). Here, $\Delta n_{550}$ represents a difference in refractive index generated by refractive index anisotropy of the region R in a case where the wavelength of incidence light is 550 nm, and d represents the thickness of the optically anisotropic film 16.

$$200\ \text{nm} \leq \Delta n_{550} \times d \leq 350\ \text{nm} \quad (1)$$

That is, in a case where the in-plane retardation $Re(550)=\Delta n_{550}\times d$ of the plurality of regions R of the optically anisotropic film 16 satisfies Expression (1), a sufficient amount of a circularly polarized light component in light incident into the optically anisotropic film 16 can be converted into circularly polarized light that travels in a direction tilted in a forward direction or reverse direction with respect to the arrow X direction. It is more preferable that the in-plane retardation $Re(550)=\Delta n_{550}\times d$ satisfies $225\ \text{nm}\leq\Delta n_{550}\times d\leq 340\ \text{nm}$, and it is still more preferable that the in-plane retardation $Re(550)=\Delta n_{550}\times d$ satisfies $250\ \text{nm}\leq\Delta n_{550}\times d\leq 330\ \text{nm}$.

Expression (1) is a range with respect to incidence light having a wavelength of 550 nm. However, an in-plane retardation $Re(k)=\Delta n\lambda\times d$ of the plurality of regions R of the optically anisotropic film with respect to incidence light having a wavelength of λ nm is preferably in a range defined by the following Expression (1-2) and can be appropriately set.

$$0.7\lambda\text{nm} \leq \Delta n\lambda \times d \leq 1.3\lambda\text{nm} \quad (1\text{-}2)$$

In addition, the value of the in-plane retardation of the plurality of regions R of the optically anisotropic film 16 in a range outside the range of Expression (1) can also be used. Specifically, by satisfying $\Delta n_{550}\times d<200$ nm or $350\ \text{nm}<\Delta n_{550}\times d$, the light can be classified into light that travels in the same direction as a traveling direction of the incidence light and light that travels in a direction different from a traveling direction of the incidence light. In a case where $\Delta n_{550}\times d$ approaches 0 nm or 550 nm, the amount of the light component that travels in the same direction as a traveling direction of the incidence light increases, and the amount of the light component that travels in a direction different from a traveling direction of the incidence light decreases.

Further, it is preferable that an in-plane retardation $Re(450)=\Delta n_{450}\times d$ of each of the plurality of regions R of the optically anisotropic film 16 with respect to incidence light having a wavelength of 450 nm and an in-plane retardation $Re(550)=\Delta n_{550}\times d$ of each of the plurality of regions R of the optically anisotropic film 16 with respect to incidence light having a wavelength of 550 nm satisfy the following Expression (2). Here, $\Delta n_{450}$ represents a difference in refractive index generated by refractive index anisotropy of the region R in a case where the wavelength of incidence light is 450 nm.

$$(\Delta n_{450}=d)/(\Delta n_{550}\times d)<1.0 \qquad (2)$$

Expression (2) represents that the liquid crystal compound 30 in the optically anisotropic film 16 has reverse dispersibility. That is, by satisfying Expression (2), the optically anisotropic film 16 can correspond to incidence light having a wide range of wavelength.

Here, by changing the single period Λ of the liquid crystal alignment pattern formed in the optically anisotropic film 16, refraction angles of the transmitted light components $L_2$ and $L_5$ can be adjusted. Specifically, as the single period Λ of the liquid crystal alignment pattern decreases, light components transmitted through the liquid crystal compounds 30 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and $L_4$ vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 30A of the liquid crystal compound 30 that rotates in the arrow X direction, the refraction direction of transmitted light can be reversed.

It is not necessary that the 180° rotation period in the optically anisotropic film is uniform over the entire surface. That is, the optically anisotropic film may have regions having different lengths of the 180° rotation periods (lengths Λ of the single periods) in a plane.

A minimum value of the length of the single period over which the direction of the optical axis derived from the liquid crystal composition rotates by 180° is preferably 20 μm or less, more preferably 5 μm or less, and still more preferably 2 μm or less. The lower limit is not particularly limited and is 0.5 μm or more in many cases.

In addition, the optically anisotropic film may have a portion where the direction of the optical axis is constant as long as a part thereof has the liquid crystal alignment pattern in which the direction of the optical axis rotates in at least one in-plane direction.

The thickness of the optically anisotropic film is not particularly limited and is preferably ¼ times the minimum value of the length of the single period over which the direction of the optical axis derived from the liquid crystal composition rotates by 180°. The upper limit is not particularly limited and is less than or equal to two times the minimum value of the length of the single period in many cases.

The thickness of the optically anisotropic film is not particularly limited and, from the viewpoint of easily forming a second region described below, is preferably 0.1 μm or more, more preferably 0.5 μm or more, and still more preferably 1.5 μm or more. The upper limit is not particularly limited and is preferably 20 μm or less and more preferably 15 or μm or less.

The optically anisotropic film 16 satisfies the following requirement X.

Requirement X: in a case where any position on one surface of the optically anisotropic film in a cross-section of the optically anisotropic film taken along a direction in which the liquid crystal alignment pattern extends is represented by a position P1, a position at which a line and another surface of the optically anisotropic film intersect with each other is represented by a position P2, the line being formed by connecting positions at which directions of optical axes derived from the liquid crystal compounds are the same as a direction of an optical axis derived from the liquid crystal compound at the position P1 from the position P1 to the other surface of the optically anisotropic film, and a distance between the position P1 and the position P2 in the one in-plane direction of the optically anisotropic film is represented by a distance D, a first region where an angle between an optical axis derived from the liquid crystal compound at a position X on the one surface of the optically anisotropic film and an optical axis derived from the liquid crystal compound at a position Y on the other surface of the optically anisotropic film that is distant from the position X by the distance D in the direction in which the liquid crystal alignment pattern extends is less than 3° and a second region where the angle is 3° or more are provided in the optically anisotropic film.

Hereinafter, the requirement X will be described in detail.

Figure 6:
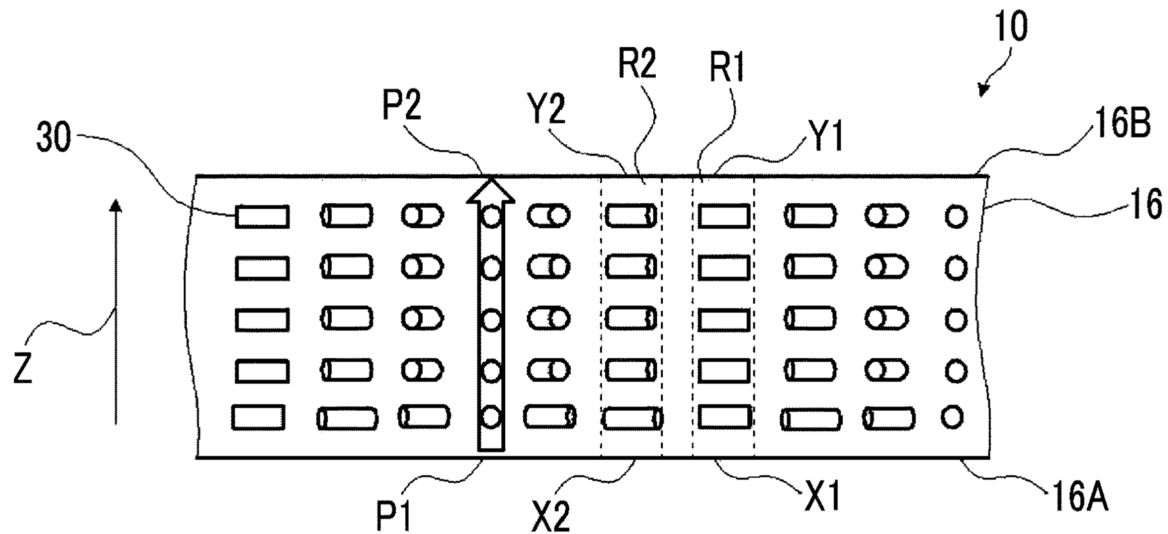
FIG. 6 is a cross-sectional view conceptually showing an example of the optically anisotropic film to describe a requirement X.
Figure 7:
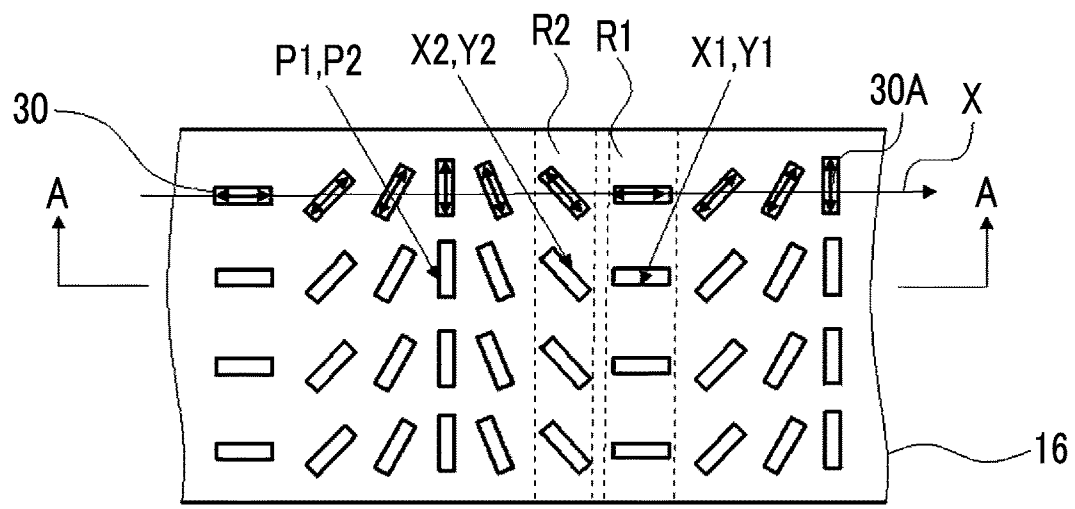
FIG. 7 is a plan view showing the optically anisotropic film shown in FIG. 6.

FIG. 6 corresponds to a cross-section (vertical section) of the optically anisotropic film 16 taken in a direction along the liquid crystal alignment pattern (also referred to as the direction in which the liquid crystal alignment pattern extends). FIG. 7 is a plan view showing another surface 16B of the optically anisotropic film 16 of FIG. 6, and FIG. 6 is a cross-sectional view taken along line A-A of FIG. 7.

A direction of the optical axis 30A of the liquid crystal compound 30 shown in FIG. 6 to be most adjacent to one surface 16A of the optically anisotropic film 16 represents a direction of the optical axis 30A of the liquid crystal compound 30 on the one surface 16A. In addition, a direction of the optical axis 30A of the liquid crystal compound 30 shown in FIG. 6 to be most adjacent to the other surface 16B of the optically anisotropic film 16 represents a direction of the optical axis 30A of the liquid crystal compound 30 on the other surface 16B.

In the cross-section, one position (any position) on the one surface 16A of the optically anisotropic film 16 is set as the position P1 (refer to FIG. 6). The direction of the optical axis 30A derived from the liquid crystal compound 30 at the position P1 is along the Y direction as shown in FIGS. 6 and 7. Next, in the cross-section shown in FIG. 6, a line is formed by connecting positions at which the directions of the optical axes 30A derived from the liquid crystal compounds 30 are the same as the direction of the optical axis 30A derived from the liquid crystal compound 30 at the position P1 from the position P1 to the other surface 16B of the optically anisotropic film 16. In FIG. 6, the directions of the optical axes 30A derived from the liquid crystal compounds 30 at the position P1 are the same in the thickness direction, and thus the line is formed toward the white arrow of FIG. 6. A position at which the formed line and the other surface 16B of the optically anisotropic film 16 intersect with each other is set as the position P2. Next, the distance D between the position P1 and the position P2 in the one in-plane direction of the optically anisotropic film 16 (in other words, the direction in which the liquid crystal alignment pattern extends) is calculated. In FIG. 6, the position P1 and the position P2 are positioned in the same place in the one in-plane direction, and thus the distance D is calculated as 0.

A method of specifying the direction of the optical axis derived from the liquid crystal compound in the cross-section of the optically anisotropic film is not particularly limited, and examples thereof include a method of observing the cross-section of the optically anisotropic film with an atomic force microscope (AFM) to analyze the shape thereof.

Next, an angle between the optical axis derived from the liquid crystal compound at the position X on the one surface 16A of the optically anisotropic film 16 and the optical axis derived from the liquid crystal compound at the position Y on the other surface 16B of the optically anisotropic film 16 is obtained. The position X may be positioned in any place of the one surface 16A of the optically anisotropic film 16. In addition, the position Y is positioned in a place of the other surface of the optically anisotropic film that is distant from the position X by the distance D along the liquid crystal alignment pattern.

A relationship between the position X and the position Y is shown in FIGS. 6 and 7. As shown in FIGS. 6 and 7, in a case where a position X1 is selected as the position X, the distance D in the optically anisotropic film 16 is 0. Therefore, the position Y corresponds to a position Y1 on the surface side facing the position X1.

Next, an angle between the optical axis 30A derived from the liquid crystal compound 30 at the position X1 and the optical axis 30A derived from the liquid crystal compound 30 at the position Y1 is calculated. As shown in FIG. 6, in a region R1 where the position X1 and the position Y1 are positioned, the optical axes derived from the liquid crystal compounds 30 are directed to the same direction. That is, in the region R1, an angle between the optical axis 30A derived from the liquid crystal compound 30 on the one surface 16A of the optically anisotropic film 16 and the optical axis 30A derived from the liquid crystal compound 30 on the other surface 16B of the optically anisotropic film 16 is 0°. Accordingly, the angle between the optical axis 30A derived from the liquid crystal compound 30 at the position X1 and the optical axis 30A derived from the liquid crystal compound 30 at the position Y1 is 0°.

Hereinabove, as described above, a region where the angle between the optical axis derived from the liquid crystal compound 30 at the position X and the optical axis derived from the liquid crystal compound at the position Y is less than 3° will also be referred to as the first region.

Next, in a case where a position X2 is selected as the position X, the distance D in the optically anisotropic film 16 is 0. The position Y corresponds to a position Y2 on the surface side facing the position X2.

Figure 8:
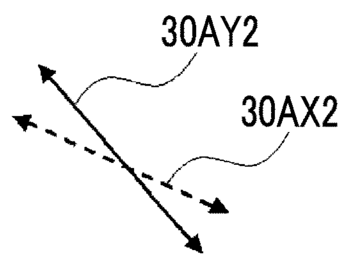
FIG. 8 is a diagram showing a relationship between optical axes.

Next, an angle between the optical axis 30A derived from the liquid crystal compound 30 at the position X2 and the optical axis 30A derived from the liquid crystal compound 30 at the position Y2 is calculated. As shown in FIG. 6, in a region R2 where the position X2 and the position Y2 are positioned, the liquid crystal compounds 30 are twisted and aligned. That is, the direction of the optical axis derived from the liquid crystal compound 30 changes depending on positions in the thickness direction. FIG. 8 is a diagram showing a state where an optical axis 30AX2 of the liquid crystal compound 30 at the position X2 and an optical axis 30AY2 of the liquid crystal compound 30 at the position Y2 are laminated during observation from the thickness direction. As shown in FIG. 8, the optical axis 30AX2 and the optical axis 30AY2 form a predetermined angle, and this angle is 3° or more. That is, in the region R2 where the position X2 and the position Y2 are positioned, an angle between the optical axis 30AX2 derived from the liquid crystal compound 30 on the one surface 16A of the optically anisotropic film 16 and the optical axis 30AY2 derived from the liquid crystal compound 30 on the other surface 16B of the optically anisotropic film 16 is 3° or more.

Hereinabove, as described above, a region where the angle between the optical axis derived from the liquid crystal compound 30 at the position X and the optical axis derived from the liquid crystal compound at the position Y is 3° or more will also be referred to as the second region.

In the optically anisotropic film 16, the first region is a region where the angle between the optical axis derived from the liquid crystal compound on the one surface 16A and the optical axis derived from the liquid crystal compound on the other surface 16B during observation from the normal direction of the surface of the optically anisotropic film 16 is less than 3°.

In addition, in the optically anisotropic film 16, the second region is a region where the angle between the optical axis derived from the liquid crystal compound on the one surface 16A and the optical axis derived from the liquid crystal compound on the other surface 16B during observation from the normal direction of the surface of the optically anisotropic film 16 is 3° or more.

In other words, the optically anisotropic film 16 includes the first region where the liquid crystal compounds are not twisted and aligned in the thickness direction or where the liquid crystal compounds are twisted and aligned in the thickness direction and the twisted angle is less than 3° and the second region where the liquid crystal compounds are twisted and aligned in the thickness direction and the twisted angle is 3° or more.

As described above, the optically anisotropic film 16 includes both of the first region and the second region.

In FIGS. 6 and 7, a part of the region of the optically anisotropic film 16 is any one of the first region or the second region. As shown in FIG. 6, in a case where the direction of the optical axis 30A derived from the liquid crystal compound 30 in the optically anisotropic film 16 is substantially parallel or substantially perpendicular to the liquid crystal alignment pattern, this region mainly corresponds to the first region, and the other region is likely to correspond to the second region.

Therefore, in the optically anisotropic film 16, the first region, the second region, the first region, and the second region appear in this order between the single periods in the liquid crystal alignment pattern. That is, in the optically anisotropic film 16, the first region and the second region alternately appear, and at least two first regions and at least two second regions appear between the single periods.

In particular, a range where the angle of the optical axis 30A derived from the liquid crystal compound 30 with respect to the direction in which the liquid crystal alignment pattern extends is 0° to 20° is likely to be the first region, a range where the angle of the optical axis 30A derived from the liquid crystal compound 30 is more than 20° and less than 70° is likely to be the second region, and a range where the angle of the optical axis 30A derived from the liquid crystal compound 30 is 70° to 90° is likely to be the first region.

In addition, in the above description, the distance D is calculated assuming that the position where the direction of the optical axis 30A derived from the liquid crystal compound 30 is along the Y direction is the position P1. However, the distance D may be calculated assuming that another position is the position P1.

For example, assuming that the position X2 in FIG. 6 is "the position P1", as shown in FIG. 8, the optical axis 30A derived from the liquid crystal compound 30 in the other surface 16B of the region R2 is tilted in the Y direction with respect to the optical axis 30A derived from the liquid crystal compound 30 on the one surface 16A. Therefore, the position P2 is positioned between the position Y1 and the position Y2, and a predetermined value a is adopted as the distance D.

Next, a case where the position X2 in FIG. 6 is adopted as "the position X" is assumed. Assuming that the value a is adopted as the distance D, the position X2 and the position on the other surface 16B that is shifted from the position X2 by the distance D in the direction in which the liquid crystal alignment pattern extends have the same relationship between the position P1 and the position P2. Therefore, at both of the positions, the directions of the optical axes 30A derived from the liquid crystal compounds 30 are the same. In this case, this region corresponds to "the first region".

On the other hand, in a case where the position X1 in FIG. 6 is adopted as "the position X", assuming that the value a is adopted as the distance D, at the position X1 and the position on the other surface 16B that is shifted from the position X1 by the distance D in the direction in which the liquid crystal alignment pattern extends, a region where the directions of the optical axes 30A derived from the liquid crystal compounds 30 are different by 3° or more is formed. In this case, this region corresponds to "the second region".

In a case where the distance D is a value other than 0 as described above, the position on the other surface that is distant from the position X on the one surface of the optically anisotropic film by the distance D in the same direction as the direction from the position P1 to the position P2 is the position Y.

In the first region, the angle between the optical axis derived from the liquid crystal compound at the position X on the one surface of the optically anisotropic film and the optical axis derived from the liquid crystal compound at the position Y on the other surface of the optically anisotropic film that is distant from the position X by the distance D in the direction in which the liquid crystal alignment pattern extends only needs to be 3° or more. The angle is preferably 5° or more and more preferably 7° or more. The upper limit of the angle is preferably 20° or less and more preferably 10° or less.

In the second region, the angle between the optical axis derived from the liquid crystal compound at the position X on the one surface of the optically anisotropic film and the optical axis derived from the liquid crystal compound at the position Y on the other surface of the optically anisotropic film that is distant from the position X by the distance D in the direction in which the liquid crystal alignment pattern extends only needs to be less than 3°. The angle is preferably 2° or less and more preferably 1° or less. The upper limit of the angle is preferably 0°.

A method of preparing the above-described optically anisotropic film that satisfies the requirement X is not particularly limited and can be achieved, for example, by adjusting the thickness of the optically anisotropic film. In the liquid crystal alignment pattern, as described above, the direction of the optical axis derived from the liquid crystal compound changes while continuously rotating in at least one in-plane direction. During the formation of the liquid crystal alignment pattern, an alignment film (in particular, a photo-alignment film) is used in many cases. In a case where the optically anisotropic film is prepared using the alignment film, the liquid crystal compound positioned on the alignment film is aligned in a predetermined direction according to an alignment restriction force of the alignment film. As the distance from the alignment film side increases, the alignment restriction force of the alignment film is weakened, and the liquid crystal compound is not likely to be aligned. In particular, as a characteristic of the liquid crystal compound, the liquid crystal compounds are likely to be arranged in the direction defined by the alignment film in the direction that is substantially parallel and substantially perpendicular to the direction in which the liquid crystal alignment pattern extends. In the other region, the directions of the optical axes derived from the liquid crystal compounds on the one surface and the other surface may deviate from each other. Therefore, for example, in a case where the optically anisotropic film is prepared using the liquid crystal composition including the liquid crystal compound, by thickening the coating film of the liquid crystal composition including the liquid crystal compound such that the alignment restriction force of the alignment film on the one surface of the optically anisotropic film is weakened, in a partial region of the optically anisotropic film (region where the liquid crystal compound is aligned in a direction other than the direction that is substantially parallel and substantially perpendicular to the direction in which the liquid crystal alignment pattern extends), the region (the above-described second region) where the directions of the optical axes derived from the liquid crystal compounds on the one surface and the other surface of the optically anisotropic film are different can be formed.

In the above description, the method of adjusting the thickness of the optically anisotropic film to prepare the optically anisotropic film including the first region and the second region is described, and other methods may be adopted. For example, depending on the kinds of the liquid crystal compounds, the liquid crystal compounds are likely to be arranged in the direction defined by the alignment film in the direction that is substantially parallel and substantially perpendicular to the direction in which the liquid crystal alignment pattern extends. In the other region, the optical axes derived from the liquid crystal compounds on the one surface and the other surface may deviate from each other. Therefore, by selecting the kind of the liquid crystal compound, the predetermined optically anisotropic film may be prepared.

In addition, the optically anisotropic film 16 satisfies the following requirement Y1.

Requirement Y1: the optically anisotropic film is observed with a polarization microscope in a crossed nicols state, a direction of a dark line having a lowest brightness at each of positions in the direction in which the liquid crystal alignment pattern extends is specified, and a dark line at an outermost position in the polarization microscope observed region among some of the dark lines at the positions that are parallel to the direction in which the liquid crystal alignment pattern extends is set as a reference dark line, a rotation angle of the dark line at each of the positions in the direction in which the liquid crystal alignment pattern extends from the reference dark line with respect to the reference dark line is obtained, a point corresponding to the distance and the rotation angle at each of the positions is plotted at rectangular coordinates where a horizontal axis represents a distance from the reference dark line to each of the positions in the direction in which the liquid crystal alignment pattern extends and a vertical axis represents the rotation angle of the dark line at each of the positions with respect to the reference dark line, a regression line is formed with a least-squares method using the plurality of plotted points, and a difference between the rotation angle at each of the plotted points and a rotation angle of the regression line at the distance of each of the plotted points is less than 5°.

Hereinafter, the requirement Y1 will be described in detail.

In the requirement Y1, the optically anisotropic film is observed with a polarization microscope in a crossed nicols state, and a direction of a dark line having a lowest brightness at each of positions in the direction in which the liquid crystal alignment pattern extends is specified. In a case where the optically anisotropic film is observed with the polarization microscope, the optically anisotropic film is observed while rotating the optically anisotropic film.

For example, during the observation with the polarization microscope from the other surface 16B side of the optically anisotropic film 16 shown in FIGS. 6 and 7, the dark lines are observed in the average of the directions of the optical axes 30A derived from the liquid crystal compounds 30 in the thickness direction of the optically anisotropic film 16. More specifically, in the region R1, the directions of the optical axes 30A derived from the liquid crystal compound 30 are directed to the same direction in the thickness direction, and dark lines parallel to the directions of the optical axes 30A derived from the liquid crystal compounds 30 are observed during the observation with the polarization microscope in a crossed nicols state. In addition, in the region R2, dark lines in the average of the directions of the optical axes 30A derived from the liquid crystal compounds 30 present between the position X2 and the position Y2 are observed. Accordingly, in a case where the optically anisotropic film 16 is observed with the polarization microscope while rotating the optically anisotropic film 16 in a crossed nicols state, a pattern (hereinafter, also referred to as the dark line pattern) where the dark line changes while continuously rotating along the liquid crystal alignment pattern is observed.

The size of an observed region during the observation with the polarization microscope is preferably length 100 μm×width 100 μm. Depending on the kind of the polarization microscope, the observed region may be observed once or the observed region may be divided (for example, divided into two regions) and may observe each of the divided regions to specify the positions of the dark lines.

Figure 9:
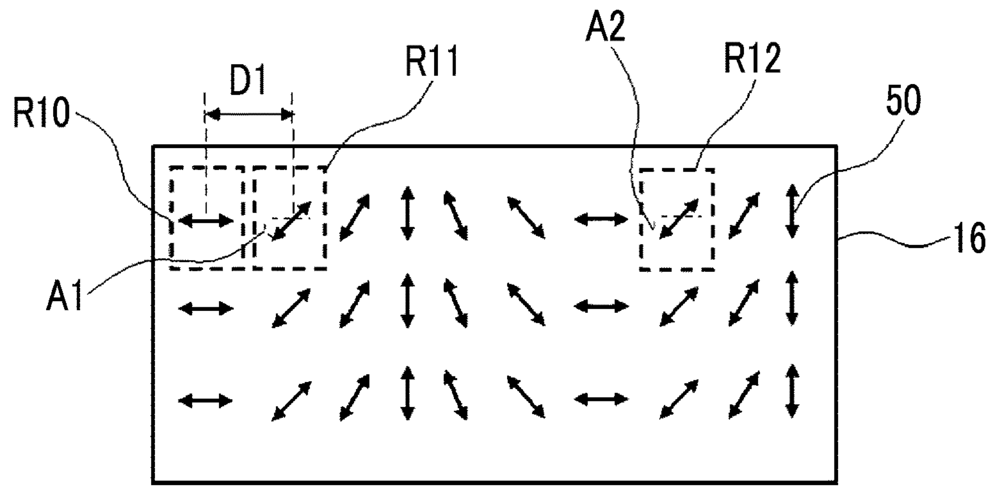
FIG. 9 is a diagram showing a pattern of a dark line.

Next, a dark line at an outermost position in the polarization microscope observed region among some of the dark lines at the positions that are parallel to the direction in which the liquid crystal alignment pattern extends is set as a reference dark line. For example, FIG. 9 is an observation diagram obtained by observing the optically anisotropic film 16 with the polarization microscope. In FIG. 9, as described above, a dark line 50 changes while continuously rotating along the liquid crystal alignment pattern.

In the polarization microscope observed region shown in FIG. 9, the dark line at the outermost position among the dark lines parallel to the direction in which the liquid crystal alignment pattern extends corresponds to the dark line positioned in a region R10, and the dark line positioned in this region is set as the reference dark line.

Next, a rotation angle of the dark line at each of the positions in the direction in which the liquid crystal alignment pattern extends from the reference dark line with respect to the reference dark line is obtained, a point corresponding to the distance and the rotation angle at each of the positions is plotted at rectangular coordinates where a horizontal axis represents a distance from the reference dark line to each of the positions in the direction in which the liquid crystal alignment pattern extends and a vertical axis represents the rotation angle of the dark line at each of the positions with respect to the reference dark line.

For example, as shown in FIG. 9, a distance D1 between the reference dark line and a dark line in a region R11 adjacent to the region R10 in the direction in which the liquid crystal alignment pattern extends is obtained, and a rotation angle A1 of the dark line in the region R11 with respect to the reference dark line is obtained. In FIG. 9, the dark line changes while rotating counterclockwise in the direction in which the liquid crystal alignment pattern extends. Therefore, the rotation angle is calculated assuming that the counterclockwise rotation has a positive value. As described above, the distance from the reference dark line to the dark line at each of the positions in the direction in which the liquid crystal alignment pattern extends and the rotation angle of the dark line at each of the positions with respect to the reference dark line are calculated, and a point corresponding to each of the positions is plotted at the rectangular coordinates where the horizontal axis represents the distance and the vertical axis represents the rotation angle as indicated by black points in FIG. 10.

A rotation angle of a dark line in a region R12 in FIG. 9 with respect to the reference dark line is shown as 180+A2°. A2 corresponds to the angle between the dark line in the region R12 and the reference dark line in a case where the dark line in the region R12 and the reference dark line overlap with each other. That is, the rotation angle of the dark line with respect to the reference dark line corresponds to the angle at which the dark line is rotated from the reference dark line to the dark line at the position in the direction in which the liquid crystal alignment pattern extends.

Next, a regression line is formed with a least-squares method using the plurality of plotted points, and a difference between the rotation angle at each of the plotted points and a rotation angle of the regression line at the distance of each of the plotted points is less than 5°.

Figure 10:
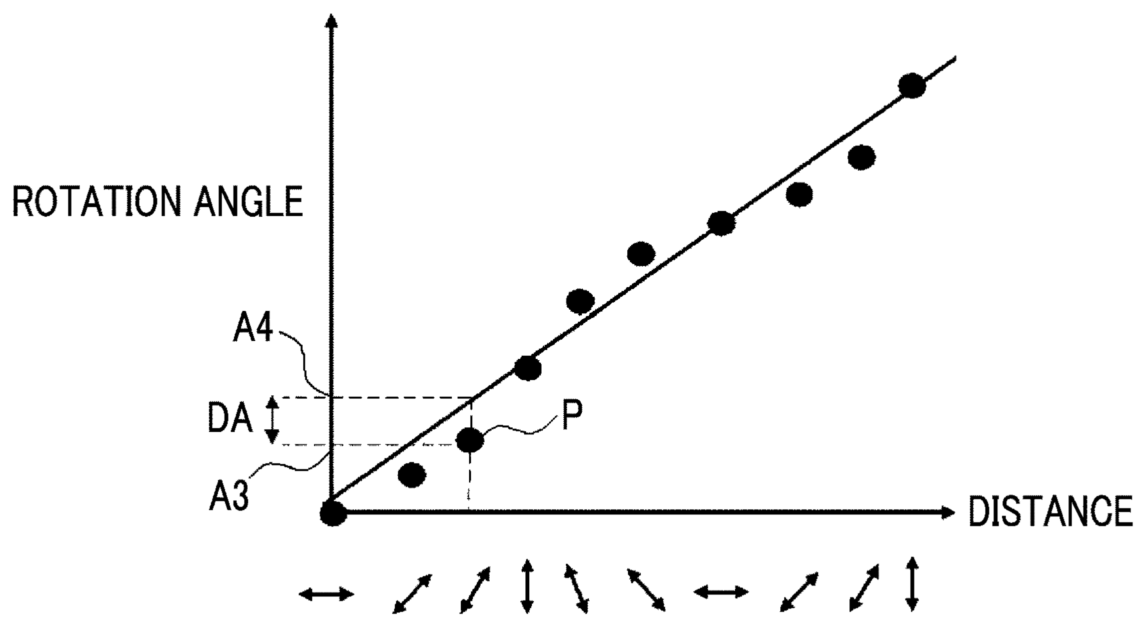
FIG. 10 is an example of a plot formed in a requirement Y1.

In FIG. 10, a regression line obtained with a least-squares method using the plotted black points is indicated by a solid line. Next, a difference between the rotation angle at each of the plotted points and a rotation angle of the regression line at the distance of each of the spots is obtained. For example, a plot P shown in FIG. 10 will be described. A difference DA between a rotation angle A3 at the plot P and a rotation angle A4 of the regression line at the distance of the plot P is calculated and is less than 5°. The example of one plot P is described above. At any of the plotted points on the rectangular coordinates in the optically anisotropic film 16, the difference is less than 5°.

A method of preparing the above-described optically anisotropic film that satisfies the requirement Y1 is not particularly limited, and examples thereof include a method of adjusting the alignment pattern of the photo-alignment film during the preparation of the optically anisotropic film.

Typically, from the viewpoint of improving the diffraction efficiency of the optically anisotropic film, it is preferable that the optical axis derived from the liquid crystal compound in the single period of the liquid crystal alignment pattern rotates at a given rotation speed. For example, this implies that the optical axis derived from the liquid crystal compound is rotated by 90° at a position of the ½ period and the optical axis derived from the liquid crystal compound is rotated by 135° at a position of the ¾ period.

Figure 11:
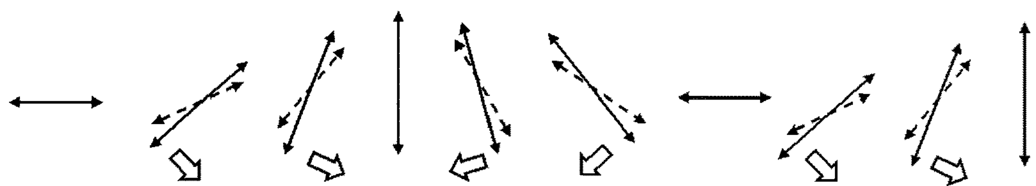
FIG. 11 is a diagram showing an alignment pattern of the photo-alignment film.

On the other hand, as described above, depending on the thickness of the optically anisotropic film and the kind of the liquid crystal compound, the optical axes derived from the liquid crystal compounds on the one surface and the other surface of the optically anisotropic film may deviate from each other. In particular, in the region other than the direction that is substantially parallel and substantially perpendicular to the direction in which the liquid crystal alignment pattern extends, the optical axes derived from the liquid crystal compounds on the one surface and the other surface of the optically anisotropic film are likely to deviate from each other. Therefore, for example, even in a case where a photo-alignment film having an ideal alignment pattern indicated by a solid line in FIG. 11 is prepared and the liquid crystal compounds are aligned on the photo-alignment film, the liquid crystal compound at a position close to the alignment film is aligned to a predetermined direction. However, as the distance from the alignment film increases, the alignment direction of the liquid crystal compound deviates in the direction indicated by the white arrow in FIG. 11. As a characteristic of the optically anisotropic film, the directions of the optical axes derived from the liquid crystal compounds in the thickness direction are averaged. Therefore, in a case where the optical axis derived from the liquid crystal compound at a position close to the alignment film and the optical axis derived from the liquid crystal compound at a position far from the alignment film are averaged, the alignment pattern deviates largely from the ideal alignment pattern, and the characteristics of the diffraction efficiency of the optically anisotropic film deteriorate.

On the other hand, in a portion where the deviation in the optical axis derived from the liquid crystal compound is large as indicated by a broken line in FIG. 11, the alignment direction of the alignment pattern of the photo-alignment film partially deviates and is arranged. As a result, even in a case where the optical axis derived from the liquid crystal compound formed on the alignment pattern is shifted in the thickness direction, the angle can be adjusted to obtain an ideal liquid crystal alignment pattern during the averaging in the thickness direction. That is, the requirement Y1 can be achieved by adjusting the alignment pattern of the photo-alignment film.

Examples of the method of adjusting the alignment pattern of the alignment film (in particular, the photo-alignment film) include a method of adjusting the alignment pattern by adjusting a polarization state of laser light to be emitted.

In FIG. 11, a part of the alignment direction of the alignment pattern rotate counterclockwise with respect to the ideal liquid crystal alignment pattern. However, the present invention is not limited to this aspect, and a part of the alignment direction of the alignment pattern may rotate clockwise with respect to the ideal liquid crystal alignment pattern depending on the materials to be used.

The method of forming the optically anisotropic film is not particularly limited. For example, by forming the photo-alignment film 14 on the support 12, applying the liquid crystal composition to the photo-alignment film 14, and curing the applied liquid crystal composition, the optically anisotropic film 16 consisting of the cured layer of the liquid crystal composition can be obtained. That is, in this case, the optically anisotropic film is formed of a cured layer of a liquid crystal composition including a rod-like liquid crystal compound or a disk-like liquid crystal compound, and has a liquid crystal alignment pattern in which an optical axis derived from the rod-like liquid crystal compound or an optical axis of the disk-like liquid crystal compound is aligned as described above.

Although the optically anisotropic film 16 functions as a so-called λ/2 plate, the present invention includes an aspect where a laminate including the support 12 and the photo-alignment film 14 that are integrated functions as a λ/2 plate.

The liquid crystal composition for forming the optically anisotropic film 16 includes the liquid crystal compound such as the rod-like liquid crystal compound or the disk-like liquid crystal compound (in particular, a liquid crystal compound having a polymerizable group), and may further include other components such as a leveling agent, an alignment control agent, a polymerization initiator, a crosslinking agent, or an alignment assistant. In addition, the liquid crystal composition may include a solvent.

In addition, it is preferable that the optically anisotropic film has a wide range for the wavelength of incidence light and is formed of a liquid crystal compound having a reverse birefringence index dispersion.

Examples of the rod-like liquid crystal compound include an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, and an alkenylcyclohexylbenzonitrile compound. As the rod-like liquid crystal compound, not only the above-described low molecular weight liquid crystal molecules but also high molecular weight liquid crystal molecules can be used.

It is preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A.

Further, as the rod-like liquid crystal compound, for example, compounds described in JP1999-513019A (JP-H11-513019A) and JP2007-279688A can be preferably used.

As the disk-like liquid crystal compound, for example, compounds described in JP2007-108732A and JP2010-244038A can be preferably used.

In a case where the disk-like liquid crystal compound is used in the optically anisotropic film, the liquid crystal compound rises in the thickness direction in the optically anisotropic film, and the optical axis derived from the liquid crystal compound is defined as an axis perpendicular to a disk surface.

The liquid crystal composition may be prepared using a well-known method in the related art. In addition, for the application of the liquid crystal composition, various well-known methods used for applying liquid, for example, bar coating, gravure coating, or spray coating can be used.

In addition, the coating thickness of the liquid crystal composition that is required to obtain an optically anisotropic film having a desired thickness may be appropriately set depending on the liquid crystal composition and the like.

As described above, as the thickness of the coating film formed by applying the liquid crystal composition increases, the distance between the one surface of the coating film and the alignment film (in particular, the photo-alignment film) increases, and the second region is likely to be formed. Therefore, the thickness of the coating film obtained by applying the liquid crystal composition is preferably 0.1 μm or more, more preferably 0.5 μm or more, and still more preferably 1.5 μm or more. The upper limit is not particularly limited and is preferably 20 μm or less and more preferably 15 or μm or less.

The coating film obtained by applying the liquid crystal composition is optionally dried and/or heated and then cured. The curing treatment may be performed using a well-known method such as photopolymerization or thermal polymerization. For the polymerization, photopolymerization is preferable. Regarding the light irradiation, ultraviolet light is preferably used. The irradiation energy is preferably 20 $mJ/cm^2$ to 50 $J/cm^2$ and more preferably 50 to 1500 $mJ/cm^2$. In order to promote a photopolymerization reaction, light irradiation may be performed under heating conditions or in a nitrogen atmosphere. The wavelength of irradiated ultraviolet light is preferably 250 to 430 nm.

By curing the liquid crystal composition, the liquid crystal compound in the liquid crystal composition is immobilized in a state (liquid crystal alignment pattern) where the liquid crystal compound is aligned along the alignment pattern of the alignment film. As a result, an optically anisotropic film having a liquid crystal alignment pattern in which a direction of an optical axis derived from the liquid crystal compound changes while continuously rotating in at least one in-plane direction is formed.

When the optically anisotropic film is completed, the liquid crystal compound does not have to exhibit liquid crystal properties. For example, the molecular weight of the liquid crystal compound having a polymerizable group may be increased by a curing reaction such that the liquid crystallinity thereof is lost.

In the optical elements shown in FIGS. 1 and 2, the direction of the optical axis 30A of the liquid crystal compound 30 in the liquid crystal alignment pattern of the optically anisotropic film 16 continuously rotates only in the arrow X direction.

However, the present invention is not limited thereto, and various configurations can be used as long as the direction of the optical axis 30A of the liquid crystal compound 30 in the optically anisotropic film continuously rotates in the one in-plane direction.

Figure 12:
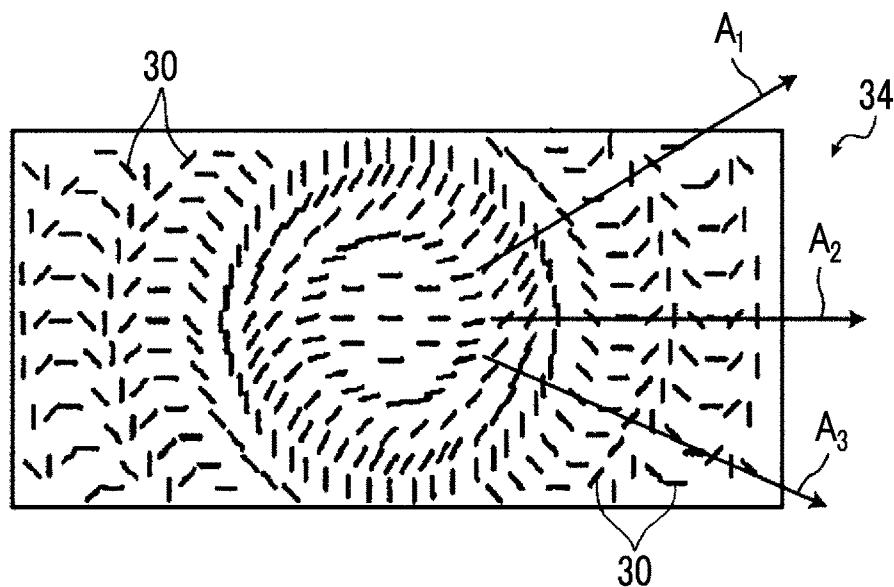
FIG. 12 is a plan view conceptually showing another example of the optically anisotropic film.

For example, an optically anisotropic film 34 conceptually shown in a plan view of FIG. 12 can be used, in which a liquid crystal alignment pattern is a concentric circular pattern having a concentric circular shape where the one in-plane direction in which the direction of the optical axis of the liquid crystal compound 30 changes while continuously rotating moves from an inner side toward an outer side. In other words, the liquid crystal alignment pattern of the optically anisotropic film 34 shown in FIG. 12 is a liquid crystal alignment pattern where the one in-plane direction in which the direction of the optical axis of the liquid crystal compound 30 changes while continuously rotating is provided in a radial shape from the center of the optically anisotropic film 34.

FIG. 12 shows only the liquid crystal compound 30 of the surface of the photo-alignment film as in FIG. 2. However, as shown in FIG. 1, the optically anisotropic film 34 has the structure in which the liquid crystal compound 30 on the surface of the alignment film is laminated as described above.

In the optically anisotropic film 34 shown in FIG. 12, the optical axis (not shown) of the liquid crystal compound 30 is a longitudinal direction of the liquid crystal compound 30.

In the optically anisotropic film 34, the direction of the optical axis of the liquid crystal compound 30 changes while continuously rotating in a direction in which a large number of optical axes move to the outer side from the center of the optically anisotropic film 34, for example, a direction indicated by an arrow A1, a direction indicated by an arrow A2, a direction indicated by an arrow A3, or . . . .

In circularly polarized light incident into the optically anisotropic film 34 having the above-described liquid crystal alignment pattern, the absolute phase changes depending on individual local regions having different directions of optical axes of the liquid crystal compound 30.

In this case, the amount of change in absolute phase varies depending on the directions of the optical axes of the liquid crystal compound 30 into which circularly polarized light is incident.

This way, in the optically anisotropic film 34 having the concentric circular liquid crystal alignment pattern, that is, the liquid crystal alignment pattern in which the optical axis changes while continuously rotating in a radial shape, transmission of incidence light can be allowed as diverging light or converging light depending on the rotation direction of the optical axis of the liquid crystal compound 30 and the direction of circularly polarized light to be incident.

That is, by setting the liquid crystal alignment pattern of the optically anisotropic film in a concentric circular shape, the optical element according to the embodiment of the present invention exhibits, for example, a function as a convex lens or a concave lens.

Each of the liquid crystal alignment patterns in the optically anisotropic film 34 shown in FIG. 12 has the same configuration as that of the above-described optically anisotropic film 16. Therefore, the optically anisotropic film 34 satisfies the above-described requirements X and Y1. The details of the requirements X and Y1 are as described above.

In an optically anisotropic film having a liquid crystal alignment pattern where the optical axis changes while continuously rotating in a radial shape, the reference dark line in the requirement Y1 is a dark line at a position closest to the center of the concentric circular shape in the polarization microscope observed region among the dark lines that are parallel to the direction in which the liquid crystal alignment pattern extends.

Figure 13:
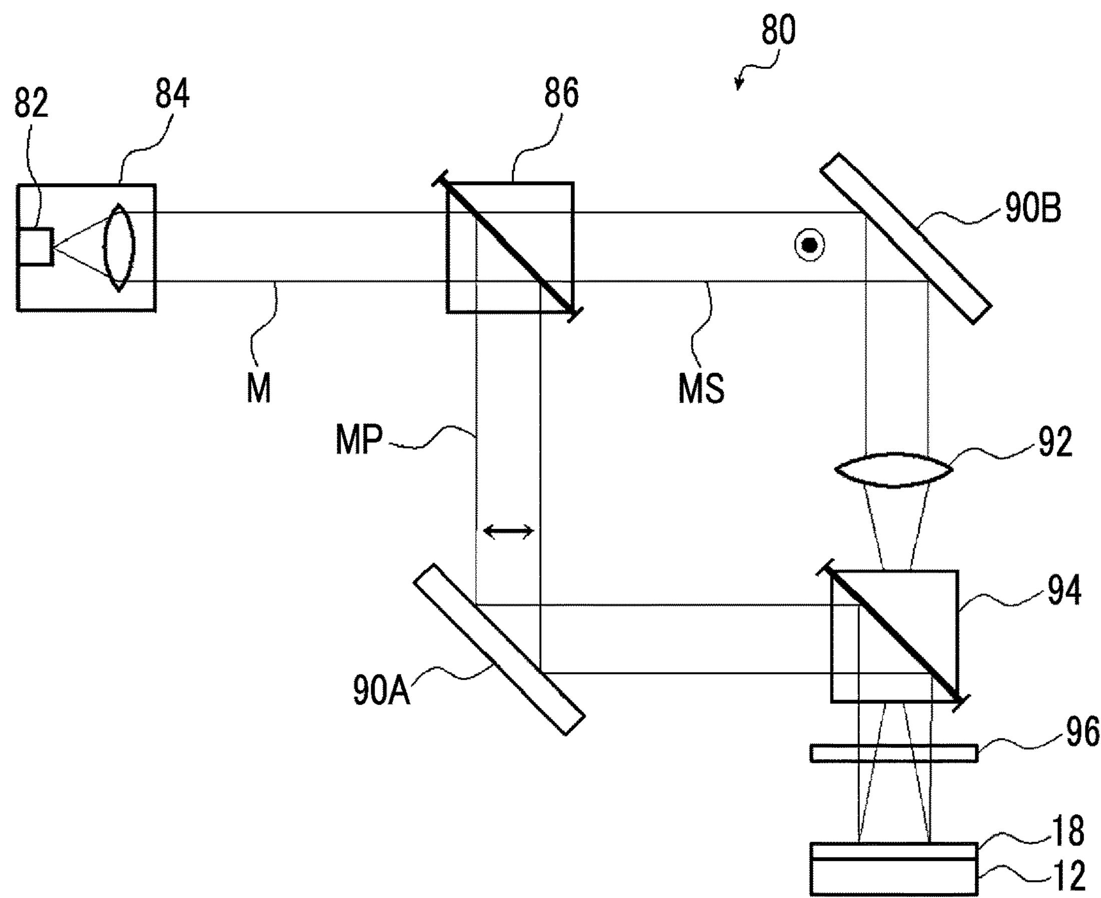
FIG. 13 is a diagram conceptually showing one example of an exposure device that exposes the photo-alignment film forming the optically anisotropic film shown in FIG. 12.

FIG. 13 conceptually shows an example of an exposure device that forms the concentric circular alignment pattern in the photo-alignment film.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the coating film (photo-alignment film precursor) 18 on the support 12.

Here, due to interference between the right circularly polarized light and the left circularly polarized light, the polarization state of light with which the coating film 18 is irradiated periodically changes according to interference fringes. The intersecting angle between the right circularly polarized light and the left circularly polarized light changes from the inside to the outside of the concentric circle. Therefore, an exposure pattern in which the pitch changes from the inner side to the outer side can be obtained. As a result, in the coating film 18, a concentric circular alignment pattern in which the alignment state periodically changes can be obtained.

Figure 14:
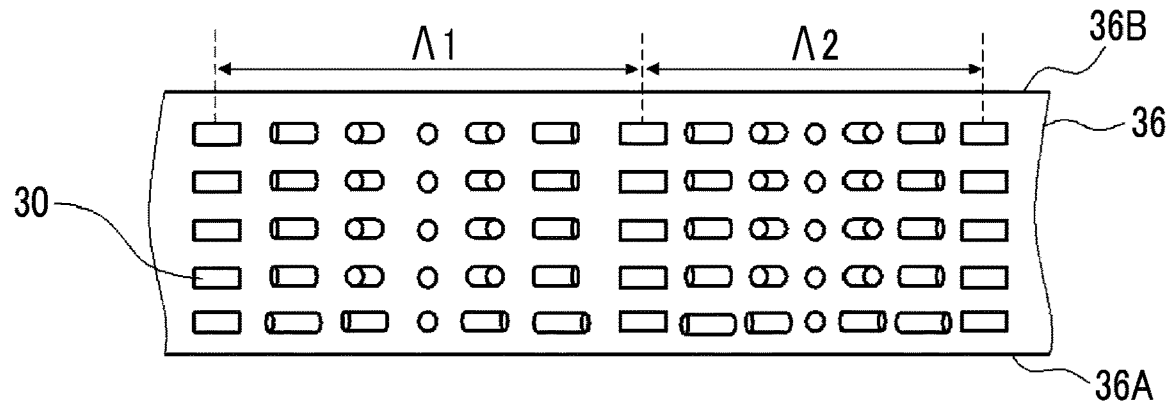
FIG. 14 is a cross-sectional view conceptually showing another example of the optically anisotropic film.
Figure 15:
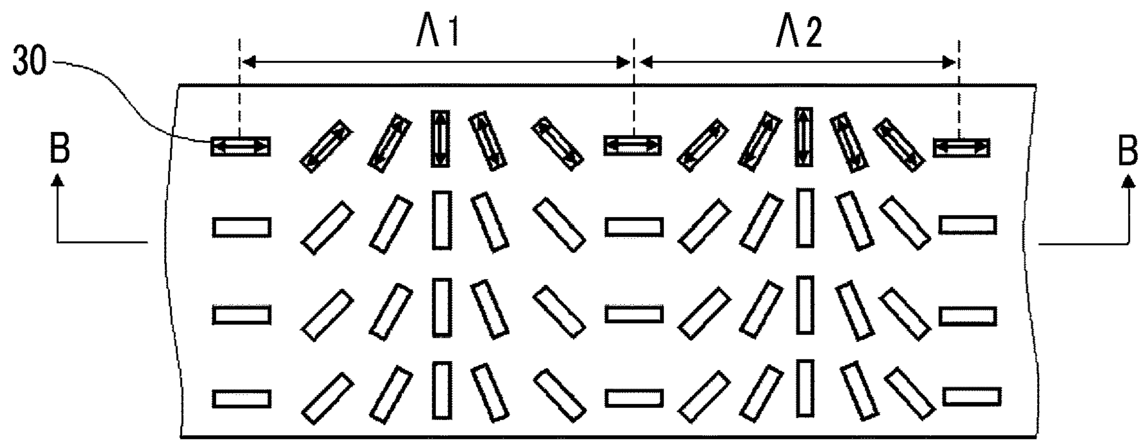
FIG. 15 is a plan view showing the optically anisotropic film of the optical element shown in FIG. 14.

In the optically anisotropic film 16 shown in FIGS. 1 and 2, the aspect where the length of the single period of the liquid crystal alignment pattern is fixed is described. As shown in FIGS. 14 and 15, an aspect where the length of the single period in the liquid crystal alignment pattern gradually decreases in the one in-plane direction in which the direction of the optical axis changes while continuously rotating in the liquid crystal alignment pattern may be adopted. By gradually decreasing the single period Λ of the liquid crystal alignment pattern, an optically anisotropic film that allows transmission of light to be collected can be obtained.

FIG. 14 is a cross-sectional view of an optically anisotropic film 36 taken in the direction in which the liquid crystal alignment pattern extends. FIG. 15 is a plan view showing another surface 36B of the optically anisotropic film 36 of FIG. 14. FIG. 14 is a cross-sectional view taken along line B-B in FIG. 15.

A direction of the optical axis 30A of the liquid crystal compound 30 shown in FIG. 14 to be most adjacent to one surface 36A of the optically anisotropic film 36 represents a direction of the optical axis 30A of the liquid crystal compound 30 on the one surface 36A. In addition, a direction of the optical axis 30A of the liquid crystal compound 30 shown in FIG. 14 to be most adjacent to the other surface 36B of the optically anisotropic film 36 represents a direction of the optical axis 30A of the liquid crystal compound 30 on the other surface 36B.

The optically anisotropic film 36 shown in FIGS. 14 and 15 has the same configuration as the optically anisotropic film 16 shown in FIGS. 6 and 7, except that the lengths of the single periods of the liquid crystal alignment patterns are different. In the optically anisotropic film 36, the length of the single period of the liquid crystal alignment pattern gradually decreases. More specifically, as shown in FIGS. 14 and 15, a single period Λ2 of the liquid crystal alignment pattern on the right side in the drawing is shorter than a single period Λ1 of the liquid crystal alignment pattern on the left side in the drawing.

The optically anisotropic film 36 has the same configuration as the optically anisotropic film 16, except that the lengths of the single periods of the liquid crystal alignment patterns are different, and satisfies the above-described requirement X.

That is, in the optically anisotropic film 36, the first region is a region where the angle between the optical axis derived from the liquid crystal compound on the one surface 36A and the optical axis derived from the liquid crystal compound on the other surface during observation from the normal direction of the surface of the optically anisotropic film 36 is less than 3°.

In addition, in the optically anisotropic film 36, the second region is a region where the angle between the optical axis derived from the liquid crystal compound on the one surface 36A and the optical axis derived from the liquid crystal compound on the other surface 36B during observation from the normal direction of the surface of the optically anisotropic film 36 is 3° or more.

In other words, the optically anisotropic film 36 includes the first region where the liquid crystal compounds are not twisted and aligned in the thickness direction or where the liquid crystal compounds are twisted and aligned in the thickness direction and the twisted angle is less than 3° and the second region where the liquid crystal compounds are twisted and aligned in the thickness direction and the twisted angle is 3° or more.

In addition, the optically anisotropic film 36 satisfies the following requirement Y2.

Requirement Y2: the optically anisotropic film is observed with a polarization microscope in a crossed nicols state while rotating the optically anisotropic film, a direction of a dark line having a lowest brightness at each of positions in the direction in which the liquid crystal alignment pattern extends is specified, and a dark line at an outermost position in the polarization microscope observed region among some of the dark lines at the positions that are parallel to the direction in which the liquid crystal alignment pattern extends is set as a reference dark line, a rotation angle of the dark line at each of the positions in the direction in which the liquid crystal alignment pattern extends from the reference dark line with respect to the reference dark line is obtained, a point corresponding to the distance and the rotation angle at each of the positions is plotted at rectangular coordinates where a horizontal axis represents a distance from the reference dark line to each of the positions in the direction in which the liquid crystal alignment pattern extends and a vertical axis represents the rotation angle of the dark line at each of the positions with respect to the reference dark line, an approximate curve is formed when quadratic function approximation is performed with a least-squares method using the plurality of plotted points, and a difference between the rotation angle at each of the plotted points and a rotation angle of the approximate curve at the distance of each of the plotted points is less than 5°.

Hereinafter, the requirement Y2 will be described in detail.

In the requirement Y2, as described above regarding the requirement Y1, in a case where the optically anisotropic film is observed with the polarization microscope while rotating the optically anisotropic film in a crossed nicols state, a direction of a dark line having a lowest brightness at each of positions in the direction in which the liquid crystal alignment pattern extends is specified. For example, during the observation with the polarization microscope from the other surface 36B side of the optically anisotropic film 36 shown in FIGS. 14 and 15, the dark lines are observed in the average of the directions of the optical axes 30A derived from the liquid crystal compounds 30 in the thickness direction of the optically anisotropic film 36.

The size of an observed region during the observation with the polarization microscope is preferably length 100 μm x width 100 μm.

Figure 16:
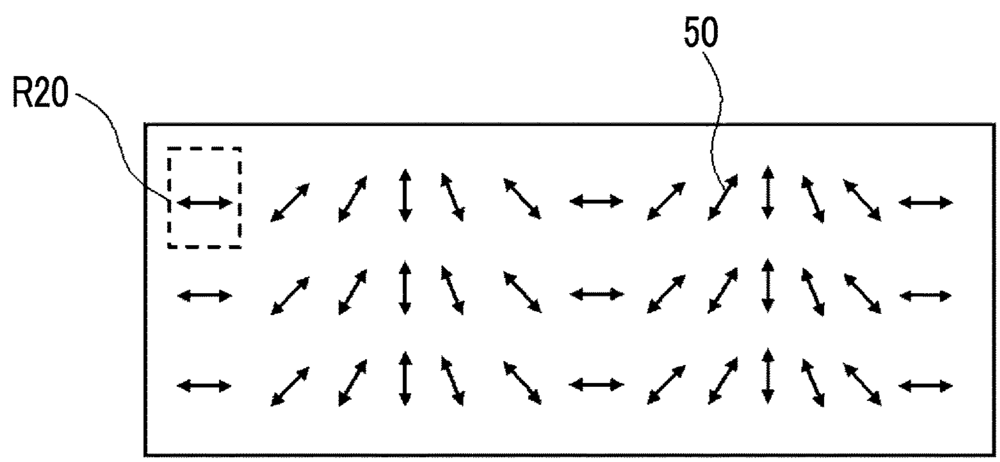
FIG. 16 is a diagram showing a pattern of a dark line.

Next, a dark line at an outermost position in the polarization microscope observed region among some of the dark lines at the positions that are parallel to the direction in which the liquid crystal alignment pattern extends is set as a reference dark line. For example, FIG. 16 is an observation diagram obtained by observing the optically anisotropic film 36 with the polarization microscope. In FIG. 16, as described above, a dark line 50 changes while continuously rotating along the liquid crystal alignment pattern.

In the polarization microscope observed region shown in FIG. 16, the dark line at the outermost position corresponds to the dark line positioned in a region R20, and the dark line positioned in this region is set as the reference dark line.

Next, a rotation angle of the dark line at each of the positions in the direction in which the liquid crystal alignment pattern extends from the reference dark line with respect to the reference dark line is obtained, a point corresponding to the distance and the rotation angle at each of the positions is plotted at rectangular coordinates where a horizontal axis represents a distance from the reference dark line to each of the positions in the direction in which the liquid crystal alignment pattern extends and a vertical axis represents the rotation angle of the dark line at each of the positions with respect to the reference dark line. Specifically, a point corresponding to each of the positions is plotted at the rectangular coordinates where the horizontal axis represents the distance and the vertical axis represents the rotation angle as indicated by black points in FIG. 17.

Next, an approximate curve is formed when quadratic function approximation is performed with a least-squares method using the plurality of plotted points, and a difference between the rotation angle at each of the plotted points and a rotation angle of the approximate curve at the distance of each of the plotted points is less than 5°.

Figure 17:
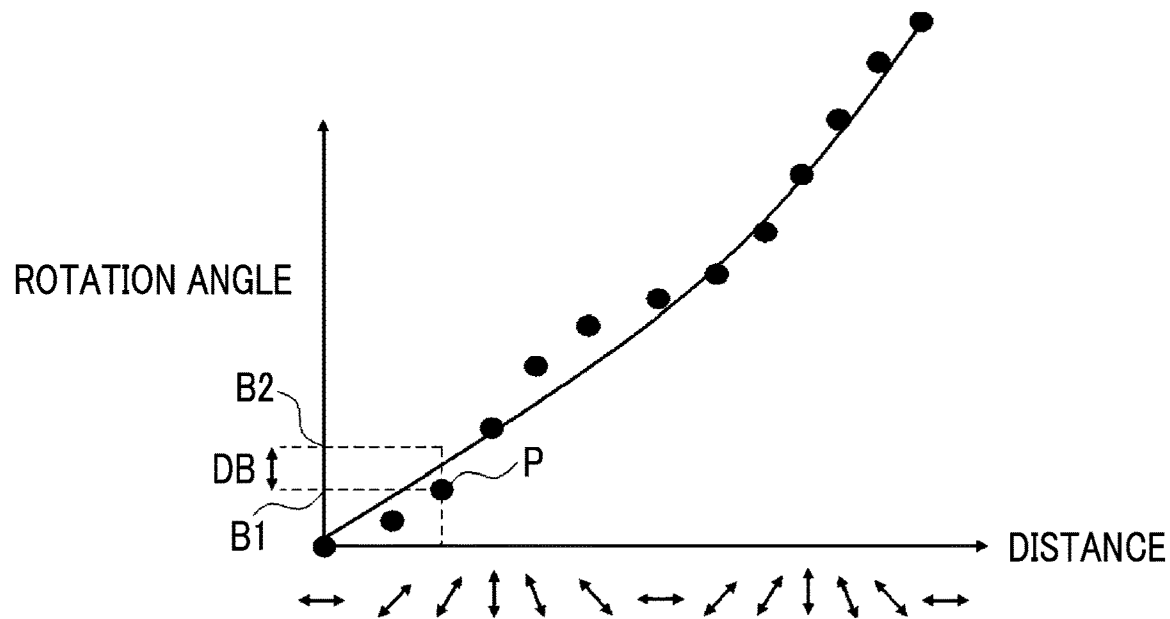
FIG. 17 is an example of a plot formed in a requirement Y2.

In FIG. 17, an approximate curve that is formed when quadratic function approximation is performed with a least-squares method using the plurality of plotted black points is indicated by a solid line. Next, a difference between the rotation angle at each of the plotted points and a rotation angle of the regression line at the distance of each of the spots is obtained. For example, a plot P shown in FIG. 17 will be described. A difference DB between a rotation angle B1 at the plot P and a rotation angle B2 of the approximate curve at the distance of the plot P is calculated and is less than 5°. The example of one plot P is described above. At any of the plotted points on the rectangular coordinates in the optically anisotropic film 36, the difference is less than 5°.

In the optically anisotropic film 36 the direction of the optical axis 30A of the liquid crystal compound 30 in the liquid crystal alignment pattern continuously rotates only in the arrow X direction.

However, the present invention is not limited to this configuration, and an optically anisotropic film (hereinafter, simply referred to as "specific optically anisotropic film 1") may be adopted, in which the liquid crystal alignment pattern is a concentric circular pattern having a concentric circular shape where the one in-plane direction in which the direction of the optical axis of the liquid crystal compound changes while continuously rotating moves from an inner side toward an outer side and where the length of the single period Λ in the liquid crystal alignment pattern gradually decreases from the center toward the outer direction in the one in-plane direction in which the optical axis continuously rotates.

The optically anisotropic film has a function as a convex lens or a concave lens using polarization of incident light.

In the specific optically anisotropic film 1, as a method of adjusting the single period Λ1 of the liquid crystal alignment pattern, as described above, by adjusting the refractive power of the lens 92 (the F number of the lens 92), the length Λ of the single period in the liquid crystal alignment pattern in the one in-plane direction in which the direction of the optical axis derived from the liquid crystal compound continuously rotates can be changed.

Each of the liquid crystal alignment patterns in the specific optically anisotropic film 1 has the same configuration as that of the above-described optically anisotropic film 36. Therefore, the specific optically anisotropic film 1 satisfies the above-described requirements X and Y2. The details of the requirements X and Y2 are as described above.

In an optically anisotropic film having a liquid crystal alignment pattern where the optical axis changes while continuously rotating in a radial shape, the reference dark line in the requirement Y2 is a dark line at a position closest to the center of the concentric circular shape in the polarization microscope observed region among the dark lines that are parallel to the direction in which the liquid crystal alignment pattern extends.

In the present invention, in a case where the optically anisotropic film is made to function as a convex lens or a concave lens, it is preferable that the optical element satisfies the following expression.

$$\Phi(r)=(\pi/\lambda)[(r^2+f^2)^{1/2}-f]$$

Here, r represents a distance from the center of a concentric circle and is represented by the following expression "$r=(x^2+y^2)^{1/2}$." x and y represent in-plane positions, and (x,y)=(0,0) represents the center of the concentric circle. Φ(r) represents an angle of the optical axis at the distance r from the center, λ represents a wavelength, and f represents a designed focal length.

In addition, in the optically anisotropic film, the alignment of the liquid crystal compound may have twisting properties in the thickness direction. In addition, the optically anisotropic film may have cholesteric alignment.

Figure 18:
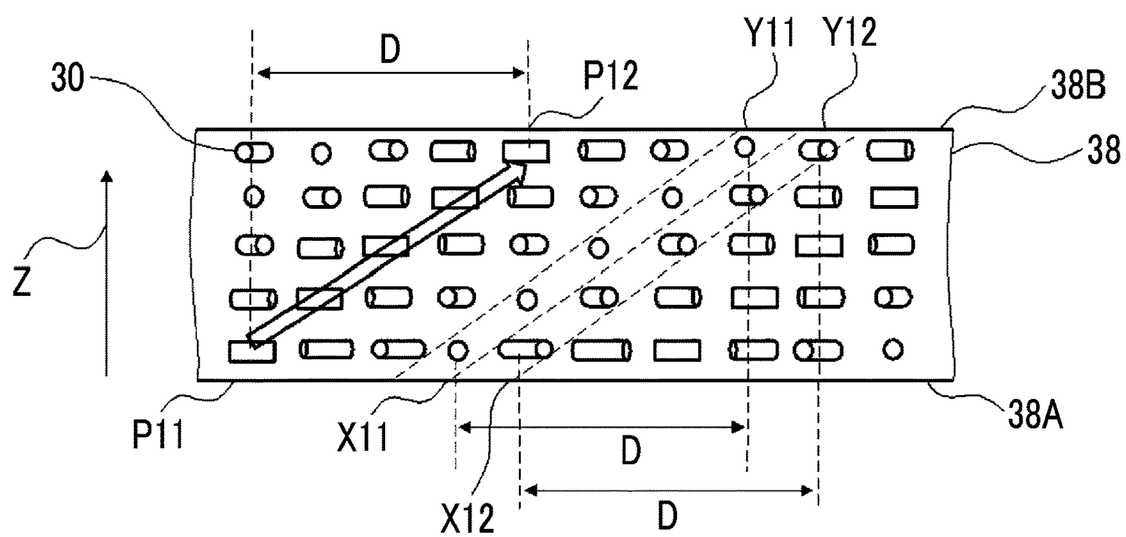
FIG. 18 is a cross-sectional view conceptually showing another example of the optically anisotropic film.

The example shown in FIG. 18 is an example where the alignment of the liquid crystal compound has twisting properties.

An optically anisotropic film 38 shown in FIG. 18 has the same configuration as the optically anisotropic film 16 shown in FIG. 1, except that it has a region where the direction of the optical axis derived from the liquid crystal compound is twisted in the thickness direction and rotates (in other words, the liquid crystal compound 30 is twisted and aligned in the thickness direction). That is, in a case where the optically anisotropic film 38 shown in FIG. 18 is seen from the thickness direction, as in the example shown in FIG. 2, the optically anisotropic film 38 has a liquid crystal alignment pattern in which the direction of the optical axis 30A of the liquid crystal compound 30 changes while continuously rotating in a plane.

FIG. 18 corresponds to a cross-section of the optically anisotropic film 38 taken in the direction in which the liquid crystal alignment pattern extends. In addition, a direction of the optical axis 30A of the liquid crystal compound 30 shown in FIG. 18 to be most adjacent to one surface 38A of the optically anisotropic film 38 represents a direction of the optical axis 30A of the liquid crystal compound 30 on the one surface 38A. In addition, a direction of the optical axis 30A of the liquid crystal compound 30 shown in FIG. 18 to be most adjacent to another surface 38B of the optically anisotropic film 38 represents a direction of the optical axis 30A of the liquid crystal compound 30 on the other surface 38B.

The optically anisotropic film 38 satisfies the above-described requirement X. Hereinafter, the description will be made with reference to FIG. 18.

In the cross-section, one position (any position) on the one surface 38A of the optically anisotropic film 38 is set as a position P11. The direction of the optical axis 30A derived from the liquid crystal compound 30 at the position P11 is along the Y direction. Next, in the cross-section shown in FIG. 18, a line is formed by connecting positions at which the directions of the optical axes 30A derived from the liquid crystal compounds 30 are the same as the direction of the optical axis 30A derived from the liquid crystal compound 30 at the position P11 in the thickness direction of the optically anisotropic film 38 (Z direction in FIG. 18) from the position P11. In FIG. 18, since the liquid crystal compounds 30 is twisted and aligned, the optical axes 30A derived from the liquid crystal compounds 30 of which the directions are the same as the direction of the optical axis 30A derived from the liquid crystal compound 30 at the position P11 are disposed in an oblique direction from the position P11 in FIG. 18. Therefore, a line is prepared toward a white arrow in FIG. 18. A position at which the formed line and the other surface 38B of the optically anisotropic film 38 intersect with each other is set as a position P12. Next, the distance D between the position P11 and the position P12 in the one in-plane direction of the optically anisotropic film 36 (in other words, the direction in which the liquid crystal alignment pattern extends) is calculated.

Next, an angle between the optical axis derived from the liquid crystal compound at the position X on the one surface 38A of the optically anisotropic film 38 and the optical axis derived from the liquid crystal compound at the position Y on the other surface 38B of the optically anisotropic film 38 is obtained. The position X may be positioned in any place of the one surface 38A of the optically anisotropic film 38. In addition, the position Y is positioned in a place of the other surface of the optically anisotropic film that is distant from the position X by the distance D along the liquid crystal alignment pattern.

As shown in FIG. 18, in a case where a position X11 is selected as the position X, a place of the other surface 38B of the optically anisotropic film 38 that is distant from the position X11 by the distance D along the liquid crystal alignment pattern corresponds to a position Y11.

Next, an angle between the optical axis 30A derived from the liquid crystal compound 30 at the position X11 and the optical axis 30A derived from the liquid crystal compound 30 at the position Y11 is calculated. Both of the direction of the optical axis 30A derived from the liquid crystal compound 30 at the position X11 and the direction of the optical axis 30A derived from the liquid crystal compound 30 at the position Y11 are directed to the Y direction. Accordingly, the angle between the optical axis 30A derived from the liquid crystal compound 30 at the position X11 and the optical axis 30A derived from the liquid crystal compound 30 at the position Y11 is 0°. That is, in the region shown in FIG. 18 where the position X11 and the position Y11 are positioned, an angle between the optical axis 30A derived from the liquid crystal compound 30 on the one surface 38A of the optically anisotropic film 38 and the optical axis 30A derived from the liquid crystal compound 30 on the other surface 38B of the optically anisotropic film 38 is 0°, and the optically anisotropic film 36 has the first region.

Next, in a case where a position X12 is selected as the position X, a place of the other surface 38B of the optically anisotropic film 38 that is distant from the position X12 by the distance D along the liquid crystal alignment pattern corresponds to a position Y12.

Figure 19:
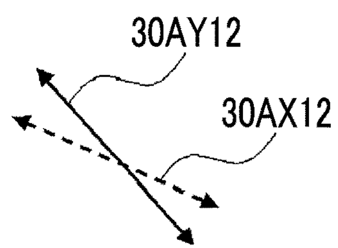
FIG. 19 is a diagram showing a relationship between optical axes.

Next, an angle between the optical axis 30A derived from the liquid crystal compound 30 at the position X12 and the optical axis 30A derived from the liquid crystal compound 30 at the position Y12 is calculated. FIG. 19 is a diagram showing a state where an optical axis 30AX12 of the liquid crystal compound 30 at the position X12 and an optical axis 30AY12 of the liquid crystal compound 30 at the position Y12 are laminated during observation from the thickness direction. As shown in FIG. 19, the optical axis 30AX12 and the optical axis 30AY12 form a predetermined angle, and this angle is 3° or more. That is, in the region where the position X12 and the position Y12 are positioned, an angle between the optical axis 30AX12 derived from the liquid crystal compound 30 on the one surface 38A of the optically anisotropic film 38 and the optical axis 30AY12 derived from the liquid crystal compound 30 on the other surface 38B of the optically anisotropic film 38 is 3° or more. That is, the optically anisotropic film 38 has the second region.

As described above, the optically anisotropic film 38 includes both of the first region and the second region.

In FIG. 18, a part of the region of the optically anisotropic film 38 is any one of the first region or the second region. In a case where the alignment film is disposed on the one surface 38A of the optically anisotropic film 38 to form the optically anisotropic film 38, in a case where the direction of the optical axis derived from the liquid crystal compound 30 on the one surface 38A in the optically anisotropic film 38 is substantially parallel or substantially perpendicular to the liquid crystal alignment pattern, this region mainly corresponds to the first region, and the other region is likely to correspond to the second region.

Therefore, in the optically anisotropic film 38, the first region, the second region, the first region, and the second region appear in this order between the single periods in the liquid crystal alignment pattern. That is, in the optically anisotropic film 16, the first region and the second region alternately appear.

In addition, the optically anisotropic film 38 satisfies the above-described requirement Y1.

Since the optically anisotropic film 38 has the liquid crystal alignment pattern, as in the optically anisotropic film 16, a dark line pattern where the dark line changes while continuously rotating along the liquid crystal alignment pattern is observed. Accordingly, it can be confirmed that the requirement Y1 is satisfied according to the above-described procedure.

This way, in order for the optically anisotropic film to have the configuration where the liquid crystal compound is twisted and aligned in the thickness direction, for example, a method of causing the liquid crystal composition for forming the optically anisotropic film to include a chiral agent can be used.

The chiral agent has a function of causing a helical structure of a liquid crystalline phase to be formed. The chiral agent may be selected depending on the purposes because a helical twisted direction and a helical twisting power (HTP) to be induced vary depending on compounds.

The chiral agent is not particularly limited, and a well-known compound (for example, Liquid Crystal Device Handbook (No. 142 Committee of Japan Society for the Promotion of Science, 1989), Chapter 3, Article 4-3, a chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a desired twisted alignment corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

In FIG. 18, the aspect where the length of the single period of the liquid crystal alignment pattern is fixed is described. However, an aspect where the length of the single period in the liquid crystal alignment pattern gradually decreases in the one in-plane direction in which the direction of the optical axis changes while continuously rotating in the liquid crystal alignment pattern may be adopted.

Hereinafter, the aspect of the optically anisotropic film 38 where the length of the single period in the liquid crystal alignment pattern gradually decreases in the one in-plane direction in which the direction of the optical axis changes while continuously rotating in the liquid crystal alignment pattern will be referred to as "the specific optically anisotropic film 2".

The specific optically anisotropic film 2 has the same configuration as the optically anisotropic film 38, except that the lengths of the single periods of the liquid crystal alignment patterns are different, and satisfies the above-described requirement X.

In addition, the specific optically anisotropic film 2 has the same dark line pattern as the optically anisotropic film 36, and thus satisfies the requirement Y2.

In addition, the aspect where the twisted direction of the liquid crystal compound 30 is the one in-plane direction is described with reference to FIG. 18. However, the present invention is not limited to this aspect.

In the present invention, for example, as in an optically anisotropic film 40 shown in FIG. 20, the optically anisotropic film may have regions where twisted directions in the thickness direction are different. In the optically anisotropic film 40, a twisted direction of the liquid crystal compound 30 in a region 401 as a lower region in the drawing (region on one surface 40A side) and a twisted direction of the liquid crystal compound 30 in a region 402 as an upper region in the drawing (region on another surface 40B side) are opposite to each other. That is, the optically anisotropic film 40 corresponds to an aspect including a region A (corresponding to the region 401) where the direction of the optical axis derived from the liquid crystal compound 30 is twisted in the thickness direction and rotates and a region B (corresponding to the region 402) where the direction of the optical axis derived from the liquid crystal compound 30 is twisted in the thickness direction and rotates, in which a twisted direction of the optical axis derived from the liquid crystal compound 30 in the region A and a twisted direction of the optical axis derived from the liquid crystal compound 30 in the region B are opposite to each other.

FIG. 20 corresponds to a cross-section of the optically anisotropic film 40 taken in the direction in which the liquid crystal alignment pattern extends. In addition, a direction of the optical axis of the liquid crystal compound 30 shown in FIG. 20 to be most adjacent to one surface 40A of the optically anisotropic film 40 represents a direction of the optical axis of the liquid crystal compound 30 on the one surface 40A. In addition, a direction of the optical axis of the liquid crystal compound 30 shown in FIG. 20 to be most adjacent to the other surface 40B of the optically anisotropic film 40 represents a direction of the optical axis of the liquid crystal compound 30 on the other surface 40B.

The optically anisotropic film 40 satisfies the above-described requirement X.

Regarding the requirement X, the method of calculating the distance D in the optically anisotropic film 40 is shown in FIG. 20 although described above.

In the cross-section, one position (any position) on the one surface 40A of the optically anisotropic film 40 is set as a position P21. The direction of the optical axis derived from the liquid crystal compound 30 at the position P21 is along the Y direction. Next, in the cross-section shown in FIG. 20, a line is formed by connecting positions at which the directions of the optical axes derived from the liquid crystal compounds 30 are the same as the direction of the optical axis derived from the liquid crystal compound 30 at the position P21 in the thickness direction of the optically anisotropic film 40 (Z direction in FIG. 20) from the position P21. In FIG. 20, since the liquid crystal compounds 30 is twisted and aligned, the optical axes derived from the liquid crystal compounds 30 of which the directions are the same as the direction of the optical axis derived from the liquid crystal compound 30 at the position P21 are disposed in an oblique direction from the position P21 in FIG. 20. Therefore, a line is prepared toward a white arrow in FIG. 20. A position at which the formed line and the other surface 40B of the optically anisotropic film 40 intersect with each other is set as a position P22. Next, the distance D between the position P21 and the position P22 in the one in-plane direction of the optically anisotropic film 40 (in other words, the direction in which the liquid crystal alignment pattern extends) is calculated.

Based on the calculated distance D, it can be confirmed that the optically anisotropic film 40 has the first region and the second region according to the above-described procedure.

In addition, the optically anisotropic film 40 satisfies the above-described requirement Y1.

Since the optically anisotropic film 40 has the liquid crystal alignment pattern, as in the optically anisotropic film 16, a dark line pattern where the dark line changes while continuously rotating along the liquid crystal alignment pattern is observed. Accordingly, it can be confirmed that the requirement Y1 is satisfied according to the above-described procedure.

The aspect including the two regions where the twisted directions of the liquid crystal compounds are opposite to each other is described with reference to FIG. 20. The optically anisotropic film may include a region where the liquid crystal compound is twisted and aligned and a region where the liquid crystal compound is not twisted and aligned.

For example, as shown in FIG. 21, an optically anisotropic film 42 may include a region (region 422) where the liquid crystal compound is not twisted and aligned that is disposed between two regions (a region 421 and a region 423) where the liquid crystal compound is twisted and aligned. More specifically, in the optically anisotropic film 42, the liquid crystal compound 30 is twisted and aligned in the region 421 as a lower region in the drawing (region on one surface 42A side), the liquid crystal compound 30 is not twisted and aligned in the region 422 as a middle region in the drawing, and the liquid crystal compound 30 is twisted and aligned in the region 423 as an upper region in the drawing (region on another surface 42B side). A twisted direction of the liquid crystal compound 30 in the region 421 and a twisted direction of the liquid crystal compound 30 in the region 423 are opposite to each other.

In addition, the aspect where the liquid crystal compound is twisted and aligned is described above. However, the liquid crystal compound may be cholesterically aligned by setting the twisted angle to 360° or more.

The optically anisotropic film and the optical element can be applied to various uses. The optically anisotropic film and the optical element can be used for various uses where transmission of light in a direction different from an incidence direction is allowed, for example, an optical path changing member, a light collecting element, a light diffusing element to a predetermined direction, a diffraction element, or the like in an optical device.

In addition, the optically anisotropic film and the optical element can be used as an optical system (for example, a light emitting portion or a light receiving section of an optical sensor) by being combined with a light source or a detector.

The optically anisotropic film according to the embodiment of the present invention can be suitably used in an optical element that allows transmission of visible light and bends the transmitted light. However, the optically anisotropic film can also be suitably used in an optical element that allows transmission of ultraviolet light or/and infrared light in addition to visible light and bends the transmitted light.

Hereinabove, the optically anisotropic film according to the embodiment of the present invention has been described above. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Comparative Example 1

(Formation of Alignment Film)

A glass substrate was used as the support.

The following composition for forming a photo-alignment film was applied to the support using a spin coater at 2500 rpm for 30 seconds. The support to which the coating film of the composition for forming a photo-alignment film was applied was dried using a hot plate at 60° C. for 60 seconds. As a result, a coating film was formed.

| Composition for Forming Photo-Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

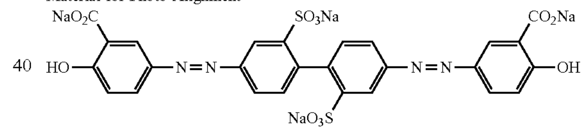

(Preparation of Photo-Alignment Film)

Using the exposure device shown in FIG. 3, the coating film was exposed to form a photo-alignment film P-1 having an alignment pattern (in the drawing, a pattern (ideal pattern) in which the arrow rotated at a fixed rotation speed in the right direction) shown in FIG. 21.

In the exposure device, a laser that emits laser light having a wavelength (325 nm) was used as the laser. The exposure amount of the interference light was 300 mJ/cm$^2$. An intersecting angle (intersecting angle $\alpha$) between the two laser beams was adjusted such that the single period $\Lambda$ (the length over which the optical axis rotates by 180°) of the alignment pattern formed by interference of the two laser beams was 2 μm.

(Formation of Optically Anisotropic Film)

As the liquid crystal composition, the following liquid crystal composition LC-1 was prepared.

| Liquid Crystal Composition LC-1 | |
|---|---|
| Liquid crystal compound L-1 | 100.00 parts by mass |
| Polymerization initiator (IRGACURE 907, manufactured by BASF SE) | 3.00 parts by mass |

-continued

| Liquid Crystal Composition LC-1 | |
| --- | --- |
| Methyl ethyl ketone | 330.60 parts by mass |

Liquid Crystal Compound L-1 (Mixture of Compounds Below)

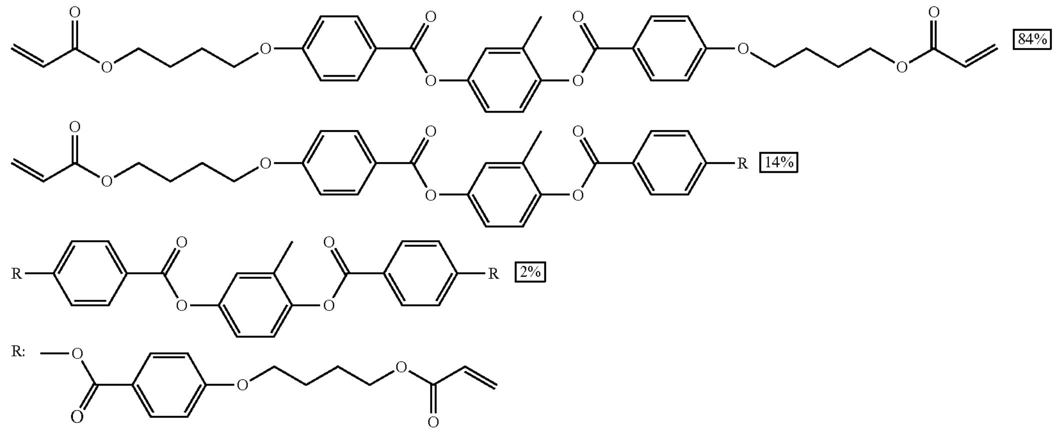

The phase transition temperature of the liquid crystal compound L-1 was obtained by heating the liquid crystal compound on a hot stage and observing the texture with a polarization microscope. As a result, the crystal-nematic phase transition temperature was 79° C., and the nematic-isotropic phase transition temperature was 144° C.

In addition, Δn of the liquid crystal compound L-1 was measured by pouring the liquid crystal compound into a wedge cell, emitting laser light having a wavelength of 550 nm, and measuring the refraction angle of the transmitted light. The measurement temperature was 60° C. Δn of the liquid crystal compound L-1 was 0.16.

The above-described liquid crystal composition LC-1 was applied to the photo-alignment film P-1 using a spin coater at 800 rpm for 10 seconds. The coating film of the liquid crystal composition LC-1 was heated on a hot plate at 80° C. for 2 minutes (120 sec).

Next, the coating film was irradiated with ultraviolet light having a wavelength of 365 nm at 80° C. at an irradiation dose of 300 mJ/cm$^2$ using a high-pressure mercury lamp in a nitrogen atmosphere. As a result, the liquid crystal composition LC-1 was cured, the alignment of the liquid crystal compound was immobilized, and an optically anisotropic film C1*a* (film thickness: 0.4 μm) was formed.

By repeating the application of the liquid crystal composition, heating, and ultraviolet irradiation multiple times on the obtained optically anisotropic film C1*a* in the same procedure, an optically anisotropic film C1 (film thickness: 2.5 μm) was obtained.

Example 1

An optically anisotropic film 1 was formed in the same procedure as that of Comparative Example 1, except that the polarization state of the laser light during the exposure of the alignment film was adjusted such that the alignment pattern was adjusted to an alignment pattern indicated by a solid line in FIG. 22. A broken line pattern in FIG. 22 indicates the pattern of the arrow in FIG. 21, and as indicated by the solid line in FIG. 22, the alignment pattern used in Example 1 deviated from the pattern (ideal pattern) of Comparative Example 1 where the arrow rotated at the fixed rotation speed according to the distance.

Comparative Example 2

An optically anisotropic film C2 was formed in the same procedure as that of Comparative Example 1, except that the photo-alignment film was adjusted using the exposure device shown in FIG. 13 such that the alignment pattern shown in FIG. 21 was obtained. The pattern spread in a concentric circular shape (refer to FIG. 12), and the length of the single period of the liquid crystal alignment pattern gradually decreased toward the outer peripheral side.

Example 2

An optically anisotropic film 2 was formed in the same procedure as that of Comparative Example 2, except that the polarization state of the laser light during the exposure of the alignment film was adjusted such that the alignment pattern was adjusted to an alignment pattern shown in FIG. 22. The pattern spread in a concentric circular shape (refer to FIG. 12), and the length of the single period of the liquid crystal alignment pattern gradually decreased toward the outer peripheral side.

<Determination on Whether or not Requirement X is Satisfied>

The optically anisotropic film obtained in each of Examples and Comparative Examples was processed with an ultramicrotome along the liquid crystal alignment pattern to expose a cross-section of the optically anisotropic film. The surface of the cross-sectional sample of the obtained optically anisotropic film was observed with an AFM, and an azimuthal angle distribution of the optical axes derived from the liquid crystal compounds was calculated from the obtained image.

Next, whether or not both of the first region and the second region were included was checked according to the procedure of the requirement X. A case where the requirement X was satisfied (the optically anisotropic film had the first region and the second region) was evaluated as "A", and a case where the requirement X was not satisfied (the optically anisotropic film had only any one of the first region or the second region) was evaluated as "B".

In Examples 1 and 2, it was verified that the first region and the second region alternately appeared in the direction in which the liquid crystal alignment pattern extended. It was verified that at least two first regions and at least two second regions were present in the single period of the liquid crystal alignment pattern.

<Determination on Whether or not Requirements Y1 and Requirement Y2 are Satisfied>

The optically anisotropic film obtained in each of Examples and Comparative Examples was observed with a polarization microscope (observed region: length 100 μm x width 100 μm) in a crossed nicols state according to the procedure of the requirement Y1 or the requirement Y2, and whether or not the requirement Y1 or the requirement Y2 was satisfied was verified. A case where the requirement Y1 or the requirement Y2 was satisfied was evaluated as "A", and a case where the requirement Y1 or the requirement Y2 was not satisfied was evaluated as "B".

A specific method of the observation with the polarization microscope is as follows. First, a 100-fold objective lens (NA value: 0.9) and a microscope digital camera (DS-Ri2, manufactured by Nikon Corporation) were attached to a polarization microscope, and the optically anisotropic film was observed in a crossed nicols state. By imaging the optically anisotropic film at each of angles while rotating the optically anisotropic film from 0° to 180° at an interval of 5°, 37 pieces of image data were obtained. A change in brightness at each of positions in a plane of the optically anisotropic film was obtained from the obtained image data, an extinction angle was obtained as an angle at which the image was the darkest, and a line at the angle was specified as a dark line. The obtained dark line changed along the liquid crystal alignment pattern while continuously rotating.

In Comparative Example 1 and Example 1, a regression line was formed with a least-squares method using the plurality of plotted points at the formed rectangular coordinates, and a difference in the rotation angle at each of the positions was obtained using the regression line.

In addition, in Comparative Example 2 and Example 2, an approximate curve was formed when quadratic function approximation was performed with a least-squares method using the plurality of plotted points at the formed rectangular coordinates, and a difference in the rotation angle at each of the positions was obtained using the approximate curve.

<Evaluation of Diffraction Efficiency>

A laser pointer (wavelength: 650 nm) was prepared as a light source, emitted light of the light source was incident into the optically anisotropic film according to the embodiment of the present invention at an incidence angle θin shown in the table through a polarizing plate and a ¼ wave plate, and the intensity of 1-order diffracted and transmitted light was measured using a power meter.

Next, the same measurement was performed in a state where the incidence angle into the optically anisotropic film was changed by 5° from the incidence angle θin shown in the table.

The following grades were given to a rate of change of the diffraction efficiency, that is, a ratio between the diffraction efficiency at the incidence angle θin+5° and the diffraction efficiency at the incidence angle θin.

In Example 1, the grades are as follows.

A: the rate of change in the diffraction efficiency was less than that of Comparative Example 1.

B: the rate of change in the diffraction efficiency was more than or equal to that of Comparative Example 1.

In Example 2, the grades are as follows.

A: the rate of change in the diffraction efficiency was less than that of Comparative Example 2.

B: the rate of change in the diffraction efficiency was more than or equal to that of Comparative Example 2.

TABLE 1

| | Requirement X | Requirement Y | Incidence Angle θ in (°) | Evaluation of Diffraction Efficiency |
|---|---|---|---|---|
| Comparative Example 1 | A | B | 15 | — |
| Example 1 | A | A | 15 | A |
| Comparative Example 2 | A | B | 0 | — |
| Example 2 | A | A | 0 | A |

As shown in Table 1, the optically anisotropic film according to the embodiment of the present invention exhibited the desired effects.

EXPLANATION OF REFERENCES

10: optical element
12: support
14: photo-alignment film
16, 34, 36, 38, 40, 42: optically anisotropic film
18: coating film
30: liquid crystal compound
30A: optical axis
50: dark line
60, 80: exposure device
62, 82: laser
64, 84: light source
68: beam splitter
70A, 70B, 90A, 90B: mirror
72A, 72B, 96: λ/4 plate
86, 94: polarization beam splitter
92: lens
Q1, Q2: absolute phase
E1, E2: equiphase surface

What is claimed is:

1. An optically anisotropic film that is formed of a liquid crystal composition including a liquid crystal compound, the optically anisotropic film comprising:

a liquid crystal alignment pattern where a direction of an optical axis derived from the liquid crystal compound changes while continuously rotating in at least one in-plane direction of the optically anisotropic film, wherein a requirement X described below and a requirement Y1 or a requirement Y2 described below are satisfied, the requirement X: in a case where any position on one surface of the optically anisotropic film in a cross-section of the optically anisotropic film taken along a direction in which the liquid crystal alignment pattern extends is represented by a position P1, a position at which a line and another surface of the optically anisotropic film intersect with each other is represented by a position P2, the line being formed by connecting positions at which directions of optical axes derived from the liquid crystal compounds are the same as a direction of an optical axis derived from the liquid crystal compound at the position P1 from the position P1 to the other surface of the optically anisotropic film, and a distance between the position P1 and the position P2 in the one in-plane direction of the optically anisotropic film is represented by a distance D, a first region where an angle between an optical axis derived from the liquid crystal compound at a position X on the one surface of the optically anisotropic film and an optical axis derived from the liquid crystal compound at a position Y on the other surface of the optically anisotropic film that is distant from the position X by the distance D in the direction in which the liquid crystal alignment pattern extends is less than 3° and a second region where the angle is 3° or more are provided in the optically anisotropic film, the requirement Y1: the optically anisotropic film is observed with a polarization microscope in a crossed nicols state, a direction of a dark line having a lowest brightness at each of positions in the direction in which the liquid crystal alignment pattern extends is specified, and a dark line at an outermost position in the polarization microscope observed region among some of the dark lines at the positions that are parallel to the direction in which the liquid crystal alignment pattern extends is set as a reference dark line, a rotation angle of the dark line at each of the positions in the direction in which the liquid crystal alignment pattern extends from the reference dark line with respect to the reference dark line is obtained, a point corresponding to the distance and the rotation angle at each of the positions is plotted at rectangular coordinates where a horizontal axis represents a distance from the reference dark line to each of the positions in the direction in which the liquid crystal alignment pattern extends and a vertical axis represents the rotation angle of the dark line at each of the positions with respect to the reference dark line, a regression line is formed with a least-squares method using the plurality of plotted points, and a difference between the rotation angle at each of the plotted points and a rotation angle of the regression line at the distance of each of the plotted points is less than 5°, the requirement Y2: the optically anisotropic film is observed with a polarization microscope in a crossed nicols state, a direction of a dark line having a lowest brightness at each of positions in the direction in which the liquid crystal alignment pattern extends is specified, and a dark line at an outermost position in the polarization microscope observed region among some of the dark lines at the positions that are parallel to the direction in which the liquid crystal alignment pattern extends is set as a reference dark line, a rotation angle of the dark line at each of the positions in the direction in which the liquid crystal alignment pattern extends from the reference dark line with respect to the reference dark line is obtained, a point corresponding to the distance and the rotation angle at each of the positions is plotted at rectangular coordinates where a horizontal axis represents a distance from the reference dark line to each of the positions in the direction in which the liquid crystal alignment pattern extends and a vertical axis represents the rotation angle of the dark line at each of the positions with respect to the reference dark line, an approximate curve is formed when quadratic function approximation is performed with a least-squares method using the plurality of plotted points, and a difference between the rotation angle at each of the plotted points and a rotation angle of the approximate curve at the distance of each of the plotted points is less than 5°.

2. The optically anisotropic film according to claim 1, wherein in a case where a length over which the optical axis derived from the liquid crystal composition rotates by 180° in a plane in the direction in which the liquid crystal alignment pattern extends is set as a single period, the length of the single period in the liquid crystal alignment pattern gradually decreases in the one in-plane direction in which the direction of the optical axis changes while continuously rotating in the liquid crystal alignment pattern, and the requirement Y2 is satisfied.

3. The optically anisotropic film according to claim 1, wherein the first region and the second region are alternately provided in the direction in which the liquid crystal alignment pattern extends.

4. The optically anisotropic film according to claim 1, wherein in a case where a length over which the optical axis derived from the liquid crystal composition rotates by 180° in a plane in the direction in which the liquid crystal alignment pattern extends is set as a single period, the first region and the second region are alternately provided in the direction in which the liquid crystal alignment pattern extends and the single period includes at least two first regions and at least two second regions.

5. The optically anisotropic film according to claim 1, wherein in a case where a length over which the optical axis derived from the liquid crystal composition rotates by 180° in a plane in the direction in which the liquid crystal alignment pattern extends is set as a single period, a minimum value of the length of the single period is 20 μm or less.

6. The optically anisotropic film according to claim 1, wherein in a case where a length over which the optical axis derived from the liquid crystal composition rotates by 180° in a plane in the direction in which the liquid crystal alignment pattern extends is set as a single period, a thickness of the optically anisotropic film is more than ¼ times a minimum value of the length of the single period.

7. The optically anisotropic film according to claim 1, wherein the liquid crystal alignment pattern is a concentric circular pattern having a concentric circular shape where the one in-plane direction in which the direction of the optical axis derived from the liquid crystal compound changes while continuously rotating moves from an inner side toward an outer side.

8. The optically anisotropic film according to claim 1, wherein the optically anisotropic film includes regions where twisted directions of the optical axes derived from the liquid crystal compounds in the thickness direction are different, the regions include a region A where the direction of the optical axis derived from the liquid crystal compound is twisted in a thickness direction and rotates and a region B where the direction of the optical axis derived from the liquid crystal compound is twisted in the thickness direction and rotates, and a twisted direction of the optical axis derived from the liquid crystal compound in the region A and a twisted direction of the optical axis derived from the liquid crystal compound in the region B are opposite to each other.

9. An optical element comprising:

the optically anisotropic film according to claim 1.

10. An optical system comprising:

the optical element according to claim 9; and a light source or a detector.

11. An optical system comprising:

the optically anisotropic film according to claim 1; and a light source or a detector.

* * * * *